US012713465B2

(12) United States Patent
Lei et al.

(10) Patent No.: US 12,713,465 B2
(45) Date of Patent: Aug. 18, 2026

(54) TECHNIQUES FOR SUPPORTING CO-EXISTENCE BETWEEN 2-STEP RANDOM ACCESS AND 4-STEP RANDOM ACCESS

(71) Applicant: QUALCOMM Incorporated, San Diego, CA (US)

(72) Inventors: Jing Lei, San Diego, CA (US); Linhai He, San Diego, CA (US); Joseph Binamira Soriaga, San Diego, CA (US); Wanshi Chen, San Diego, CA (US); Peter Gaal, San Diego, CA (US); Hung Dinh Ly, San Diego, CA (US); Tingfang Ji, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 16/790,683

(22) Filed: Feb. 13, 2020

(65) Prior Publication Data

US 2020/0288506 A1 Sep. 10, 2020

Related U.S. Application Data

(60) Provisional application No. 62/806,735, filed on Feb. 15, 2019.

(51) Int. Cl.
*H04W 74/0833* (2024.01)
*H04W 74/0836* (2024.01)
*H04W 74/0838* (2024.01)

(52) U.S. Cl.
CPC ... *H04W 74/0833* (2013.01); *H04W 74/0836* (2024.01); *H04W 74/0838* (2024.01)

(58) Field of Classification Search
CPC ........................... H04W 74/0833; Y02D 30/70
See application file for complete search history.

(56) References Cited

U.S. PATENT DOCUMENTS 9,374,796 B2 6/2016 Li et al.
9,949,298 B1 4/2018 Akoum et al.
(Continued)

FOREIGN PATENT DOCUMENTS

CN 108282895 A 7/2018
EP 3570624 A1 11/2019
(Continued)

OTHER PUBLICATIONS

Nokia, et al., "Increasing IX Opportunities for RA Messages", 3GPP TSG-RAN WG2 Meeting #105, 3GPP Draft; R2-1901259 Increasing TX Opportunities for RA Messages, 3rd Generation Partnership Project (3GPP), Mobile Competence Centre ; 650, Route Des Lucioles; F-06921 Sophia-Antipolis Cedex; Fra vol. RAN WG2, No. Athens, Greece; Feb. 25, 2019-Mar. 1, 2019, Feb. 14, 2019 (Feb. 14, 2019), 5 Pages, XP051602618, Retrieved from the Internet: URL: http://www.3gpp.org/ftp/tsg%5Fran/WG2%5FRL2/TSGR2%5F105/Docs/R2%2D1901259%2Ezip [retrieved on Fev. 14, 2019] paragraph [02.2].
(Continued)

*Primary Examiner* — Chuong M Nguyen
(74) *Attorney, Agent, or Firm* — ArentFox Schiff LLP

(57) ABSTRACT

Aspects of the present disclosure provide techniques and apparatus for wireless communication. In one aspect, a method is provided which may be performed by a wireless device such as a user equipment (UE) in a network supporting co-existence of a first type of random access and a second type of random access, which may be associated with different latency, overhead, quality of service (QoS), energy efficiency, and/or spectral efficiency.

86 Claims, 19 Drawing Sheets

| Index of RO in time/frequency/space Domains | RO#0 | RO #1 | RO #2 | RO#3 |
|---|---|---|---|---|
| Without 2-step RACH | 4-step RACH | 4-step RACH | 4-step RACH | 4-step RACH |
| With 2-step RACH | 4-step RACH | 2-step RACH | 4-step RACH | 2-step RACH |

(56) References Cited

U.S. PATENT DOCUMENTS

| | | | | |
|---|---|---|---|---|
| 2013/0286958 | A1* | 10/2013 | Liang | H04W 74/0866 370/329 |
| 2017/0359114 | A1 | 12/2017 | Akkarakaran et al. | |
| 2018/0054848 | A1* | 2/2018 | Yoo | H04L 5/0053 |
| 2018/0070380 | A1 | 3/2018 | Nagaraja et al. | |
| 2018/0205516 | A1 | 7/2018 | Jung et al. | |
| 2018/0220450 | A1* | 8/2018 | Aiba | H04W 74/004 |
| 2018/0279186 | A1* | 9/2018 | Park | H04W 36/302 |
| 2018/0324850 | A1* | 11/2018 | Amuru | H04J 11/0073 |
| 2019/0058629 | A1 | 2/2019 | Akoum et al. | |
| 2019/0132882 | A1* | 5/2019 | Li | H04W 74/0833 |
| 2019/0223214 | A1* | 7/2019 | Jiang | H04W 74/0833 |
| 2019/0254064 | A1* | 8/2019 | Islam | H04W 74/004 |
| 2019/0313447 | A1* | 10/2019 | Islam | H04W 74/0833 |
| 2020/0245364 | A1* | 7/2020 | Kim | H04W 74/004 |
| 2020/0351853 | A1* | 11/2020 | Xiong | H04W 74/006 |
| 2020/0404708 | A1* | 12/2020 | Zhang | H04W 16/14 |
| 2021/0176781 | A1* | 6/2021 | Wang | H04W 74/0833 |
| 2021/0250985 | A1* | 8/2021 | Takeda | H04W 74/002 |
| 2021/0329704 | A1* | 10/2021 | Yang | H04W 74/0833 |
| 2022/0183076 | A1* | 6/2022 | Lee | H04W 52/247 |

FOREIGN PATENT DOCUMENTS

| | | | | |
|---|---|---|---|---|
| TW | 201826861 | A | 7/2018 | |
| WO | 2016057193 | A1 | 4/2016 | |
| WO | 2018085726 | A1 | 5/2018 | |
| WO | WO-2018175809 | A1 * | 9/2018 | H04W 74/0833 |

OTHER PUBLICATIONS

Nokia, et al., "Random Access Principles for New Radio", 3GPP Draft, 3GPP TSG-RAN WG1 #87, R1-1612299_Random Access Principles for New Radio, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), XP051176248, 4 Pages, Retrieved from the Internet: URL: http://www.3gpp.org/ftp/tsg_ran/WG1_RL1/TSGR1_87/Docs/R1-1612299.zip, [retrieved on Nov. 13, 2016], Section 1, Section 2, figure 1, Section 2.4, paragraph [0002], paragraph [02.3].

European Search Report—EP22166411—Search Authority—The Hague—Jun. 3, 2022.

Taiwan Search Report—TW109104684—TIPO—Apr. 27, 2023.

Nokia, et al., "Increasing Tx Opportunities for RA Messages", 3GPP TSG-RAN WG2 Meeting #105, R2-1901259, 3rd Generation Partnership Project, Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 14, 2019, 5 Pages, XP051602618.

Nokia, et al., "Random Access Principles for New Radio", 3GPP TSG-RAN WG1 #87, R1-1612299, 3rd Generation Partnership Project, Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, 4 Pages, XP051176248.

International Search Report and Written Opinion—PCT/US2020/018425—ISA/EPO—Mar. 26, 2021.

Nokia, et al., "Increasing TX Opportunities for RA Messages", 3GPP TSG-RAN WG2 Meeting #105, 3GPP Draft; R2-1901259 Increasing TX Opportunities for RA Messages, 3RD Generation Partnership Project (3GPP), Feb. 25, 2019-Mar.1, 2019, Feb. 14, 2019 (Feb. 14, 2019), 5 Pages, XP051602618, URL: http://www.3gpp.org/ftp/tsg%5Fran/WG2%5FRL2/TSGR2%5F105/Docs/R2%2D1901259%2Ezip [retrieved on 2019-02-14] paragraph [02.2].

Nokia, et al., "Random Access Principles for New Radio", 3GPP Draft, 3GPP TSG-RAN WG1 #87, R1-1612299 Random Access Principles for New Radio, 3rd Generation Partnership Project (3GPP), USA, Nov. 14, 2016-Nov. 18, 2016, Nov. 13, 2016 (Nov. 13, 2016), XP051176248, 4 Pages, URL: http://www.3gpp.org/ftp/tsg_ran/WG1_RL1/TSGR1_87/Docs/R1-1612299.zip, [retrieved on Nov. 13, 2016], Section 1, Section 2, figure 1, Section 2.4, paragraph [0002], paragraph [02.3].

* cited by examiner

| Index of RO in time/frequency/space Domains | RO#0 | RO #1 | RO #2 | RO#3 |
|---|---|---|---|---|
| Without 2-step RACH | 4-step RACH | 4-step RACH | 4-step RACH | 4-step RACH |
| With 2-step RACH | 4-step RACH | 2-step RACH | 4-step RACH | 2-step RACH |

FIG. 12

| Index of RO in time/frequency/space Domains | RO#0 | RO #1 | RO #2 | RO#3 |
|---|---|---|---|---|
| Without 2-step RACH | 4-step RACH | 4-step RACH | 4-step RACH | 4-step RACH |
| With 2-step RACH | 4-step RACH | 4-step RACH and 2-step RACH | 4-step RACH | 4-step RACH |

FIG. 13

| Index of RO in time/frequency/space Domains | RO#0 | New RO#0 | RO#1 | RO#2 | New RO#1 | RO#3 |
|---|---|---|---|---|---|---|
| Without 2-step RACH | 4-step RACH | n/a | 4-step RACH | 4-step RACH | n/a | 4-step RACH |
| With 2-step RACH | 4-step RACH | 2-step RACH | 4-step RACH | 4-step RACH | 2-step RACH | 4-step RACH |

FIG. 14

TECHNIQUES FOR SUPPORTING CO-EXISTENCE BETWEEN 2-STEP RANDOM ACCESS AND 4-STEP RANDOM ACCESS

CROSS REFERENCE TO RELATED APPLICATIONS

This application for patent claims priority to U.S. provisional application No. 62/806,735, filed Feb. 15, 2019, which is hereby incorporated by reference in its entirety.

TECHNICAL FIELD

The present disclosure relates generally to wireless communications, and more particularly, to techniques for co-existence between 2-step random access and 4-step random access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, methods, computer-readable media, and apparatuses are provided. The apparatuses may be user equipment (UE) or a base station. Certain aspects of the present disclosure provide a method for wireless communication, performed by a wireless device, such as a user equipment (UE). The UE may operate in a network supporting co-existence of a first type of random access and a second type of random access. The method generally includes: receiving configuration information from one or more base stations in the network, the configuration information comprising one or more random access channel (RACH) occasions, the one or more RACH occasions for only the first type of random access or both the first type of random access and the second type of random access; and performing the first type of random access with at least one base station of the one or more base stations based, at least in part, on the configuration information, wherein the performing the first type of random access comprises: transmitting a first message to the at least one base station to initiate the first type of random access based, at least in part, on at least one of the one or more RACH occasions, the first message comprising a preamble and a payload; and receiving a second message associated with completion of the first type of random access, the second message transmitted by the at least one base station in response to the first message.

Certain aspects of the present disclosure provide an apparatus for wireless communication. The apparatus may operate in a network supporting co-existence of a first type of random access and a second type of random access. The apparatus generally includes at least one processor, and memory coupled to the at least one processor, the memory comprising instructions executable by the at least one processor to cause the apparatus to: receive configuration information from one or more base stations in the network, the configuration information comprising one or more random access channel (RACH) occasions, the one or more RACH occasions for only the first type of random access or both the first type of random access and the second type of random access; and perform the first type of random access with at least one base station of the one or more base stations based, at least in part, on the configuration information, wherein the performing the first type of random access comprises: transmitting a first message to the at least one base station to initiate the first type of random access based, at least in part, on at least one of the one or more RACH occasions, the first message comprising a preamble and a payload; and receiving a second message associated with completion of the first type of random access, the second message transmitted by the at least one base station in response to the first message.

Certain aspects of the present disclosure provide for an apparatus for wireless communication. The apparatus may operate in a network supporting co-existence of a first type of random access and a second type of random access. The apparatus generally includes: means for receiving configuration information from one or more base stations in the network, the configuration information comprising one or more random access channel (RACH) occasions, the one or more RACH occasions for only the first type of random access or both the first type of random access and the second type of random access; and means for performing the first type of random access with at least one base station of the one or more base stations based, at least in part, on the configuration information, wherein the means for performing the first type of random access comprises: means for transmitting a first message to the at least one base station to initiate the first type of random access based, at least in part, on at least one of the one or more RACH occasions, the first message comprising a preamble and a payload; and means for receiving a second message associated with completion of the first type of random access, the second message transmitted by the at least one base station in response to the first message.

Certain aspects of the present disclosure provide for a computer-readable medium for wireless communication by a wireless device, such as a UE. The wireless device may operate in a network supporting co-existence of a first type of random access and a second type of random access. The computer-readable medium generally includes code, which when executed by at least one processor, causes the wireless device to: receive configuration information from one or more base stations in the network, the configuration information comprising one or more random access channel (RACH) occasions, the one or more RACH occasions for only the first type of random access or both the first type of random access and the second type of random access; and perform the first type of random access with at least one base station of the one or more base stations based, at least in part, on the configuration information, wherein the performing the first type of random access comprises: transmitting a first message to the at least one base station to initiate the first type of random access based, at least in part, on at least one of the one or more RACH occasions, the first message comprising a preamble and a payload; and receiving a second message associated with completion of the first type of random access, the second message transmitted by the at least one base station in response to the first message.

Certain aspects of the present disclosure provide a method for wireless communication, performed by a wireless device, such as a base station (BS). The BS may operate in a network supporting co-existence of a first type of random access and a second type of random access. The method generally includes: determining configuration information comprising one or more random access channel (RACH) occasions, the one or more RACH occasions for only the first type of random access or both the first type of random access and the second type of random access; transmitting the configuration information to one or more user equipments (UEs) in the network; and performing the first type of random access with at least one UE of the one or more UEs based, at least in part, on the configuration information, wherein performing the first type of random access comprises: receiving a first message from the at least one UE to initiate the first type of random access based, at least in part, on at least one of the one or more RACH occasions, the first message comprising a preamble and a payload; and transmitting to the at least one UE, in response to the first message, a second message associated with completion of the first type of random access.

Certain aspects of the present disclosure provide an apparatus for wireless communication. The apparatus may operate in a network supporting co-existence of a first type of random access and a second type of random access. The apparatus generally includes at least one processor, and memory coupled to the at least one processor, the memory comprising instructions executable by the at least one processor to cause the apparatus to: determine configuration information comprising one or more random access channel (RACH) occasions, the one or more RACH occasions for only the first type of random access or both the first type of random access and the second type of random access; transmit the configuration information to one or more user equipments (UEs) in the network; and perform the first type of random access with at least one UE of the one or more UEs based, at least in part, on the configuration information, wherein performing the first type of random access comprises: receiving a first message from the at least one UE to initiate the first type of random access based, at least in part, on at least one of the one or more RACH occasions, the first message comprising a preamble and a payload; and transmitting to the at least one UE, in response to the first message, a second message associated with completion of the first type of random access.

Certain aspects of the present disclosure provide an apparatus for wireless communication. The apparatus may operate in a network supporting co-existence of a first type of random access and a second type of random access. The apparatus generally includes: means for determining configuration information comprising one or more random access channel (RACH) occasions, the one or more RACH occasions for only the first type of random access or both the first type of random access and the second type of random access; means for transmitting the configuration information to one or more user equipments (UEs) in the network; and means for performing the first type of random access with at least one UE of the one or more UEs based, at least in part, on the configuration information, wherein the means for performing the first type of random access comprises: means for receiving a first message from the at least one UE to initiate the first type of random access based, at least in part, on at least one of the one or more RACH occasions, the first message comprising a preamble and a payload; and means for transmitting to the at least one UE, in response to the first message, a second message associated with completion of the first type of random access.

Certain aspects of the present disclosure provide for a computer-readable medium for wireless communication by a wireless device, such as a BS. The wireless device may operate in a network supporting co-existence of a first type of random access and a second type of random access. The computer-readable medium generally includes code, which when executed by at least one processor, causes the wireless device to: determine configuration information comprising one or more random access channel (RACH) occasions, the one or more RACH occasions for only the first type of random access or both the first type of random access and the second type of random access; transmit the configuration information to one or more user equipments (UEs) in the network; and perform the first type of random access with at least one UE of the one or more UEs based, at least in part, on the configuration information, wherein performing the first type of random access comprises: receiving a first message from the at least one UE to initiate the first type of random access based, at least in part, on at least one of the one or more RACH occasions, the first message comprising a preamble and a payload; and transmitting to the at least one UE, in response to the first message, a second message associated with completion of the first type of random access.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 12-17 illustrate example techniques for supporting co-existence of 2-step random access and 4-step random access, in accordance with certain aspects of the present disclosure.

DETAILED DESCRIPTION

Figure 1:
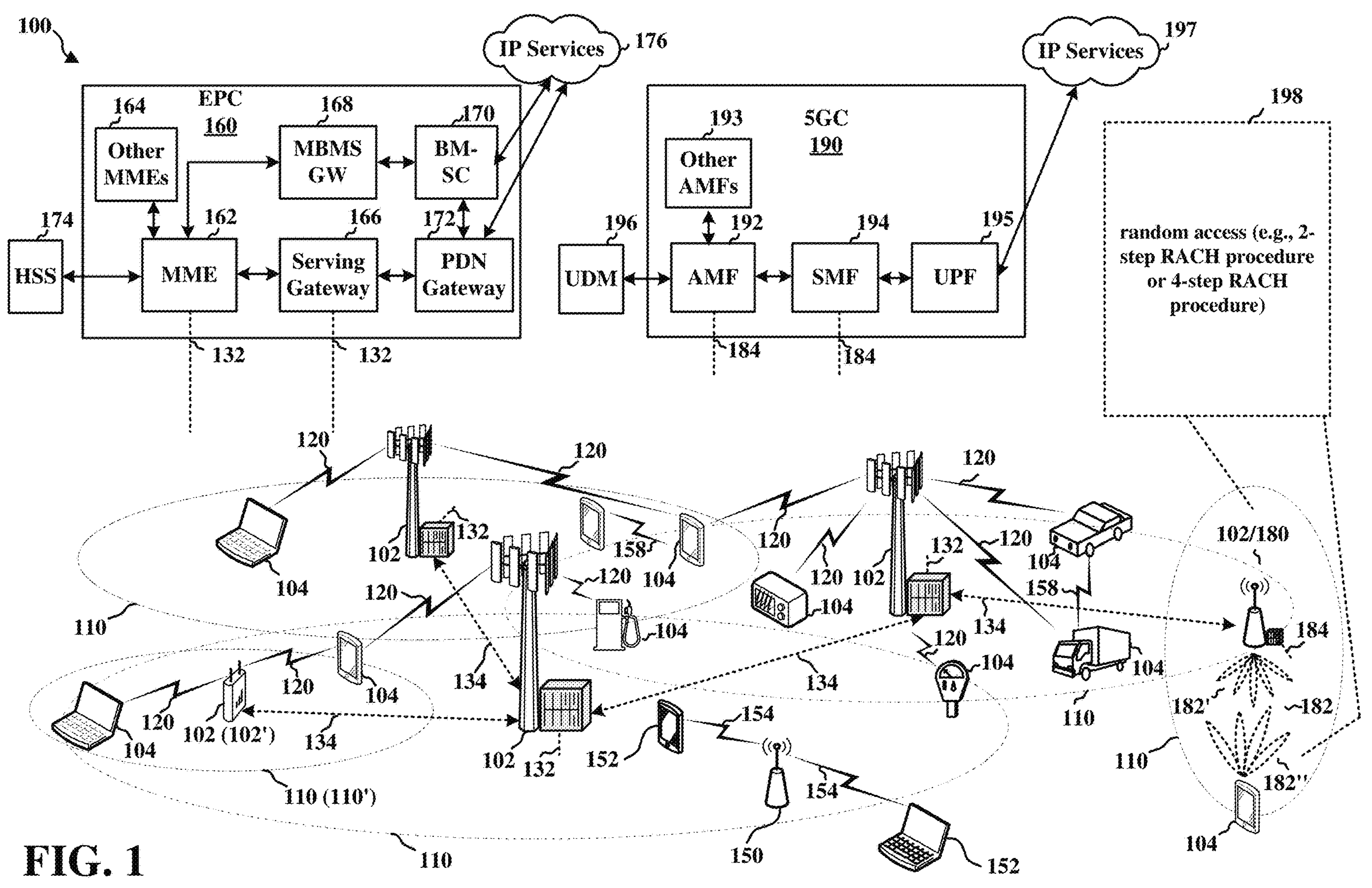
FIG. 1 is a diagram illustrating an example of a wireless communications system and an access network, in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using hardware, software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software (e.g., execute directly, or after compiling/conversion/interpretation, etc.). Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code (e.g., executable directly, or after compiling/conversion/interpretation, etc.) in the form of instructions or data structures that can be accessed by a computer. As described herein, a component or device, such as memory or another form of computer-readable medium, may be coupled (e.g., communicatively, electronically, operatively, etc.) to another component or device, such as at least one processor/processing system.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells. The term "cell" can refer to, for example, a coverage area of a BS and/or a BS subsystem serving this coverage area, depending on the context in which the term is used.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a netbook, a smartbook, a personal digital assistant (PDA), a robots/robotic device, a drone, industrial manufacturing equipment, a satellite radio, a navigation/positioning device (e.g., GNSS (global navigation satellite system) devices based on, for example, GPS (global positioning system), Beidou, GLONASS, or Galileo, a terrestrial-based device, etc.), a multimedia device, an entertainment device, a video device, a digital audio player (e.g., MP3 player), a camera, a gaming device, a tablet, a smart device, a wearable device (e.g., a smart watch, smart clothing, smart glasses, virtual reality goggles, a smart wristband, smart jewelry (e.g., a smart ring, a smart bracelet)), a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. Machine type communication (MTC) may refer to communication involving at least one remote device on at least one end of the communication and may include forms of data communication which involve one or more entities that do not necessarily need human interaction. MTC UEs may include UEs that are capable of MTC communications with, e.g., MTC servers and/or other MTC devices through Public Land Mobile Networks (PLMN), for example. Wireless devices may include Internet-of-Things (IoT) devices (e.g., narrowband IoT (NB-IoT) devices). IoT may refer to a network of physical objects, devices, or "things". IoT devices may be embedded with, for example, electronics, processing units, software, or sensors and may have network connectivity, which enable these devices to collect and exchange data. Some of the UEs 104 may be referred to as IoT devices (e.g., meters, gas pumps, toasters, robots, drones, vehicles, heart monitors, etc.). IoT UEs may include MTC/enhanced MTC (eMTC) UEs, NB-IoT UEs, as well as other types of UEs. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may perform random access (e.g., random access channel (RACH) procedure 198) with at least one base station (e.g., BS 102/180). The UE may generate a preamble associated with the RACH procedure 198. The random access may be, for example, a 2-step RACH procedure or a 4-step RACH procedure. For the 2-step procedure, the UE 104 may generate a payload, including, for example, at least one demodulation reference signal (DMRS) and information in a physical uplink shared channel (PUSCH). The UE 104 may send, in a first message to initiate the RACH procedure 198 with a base station 102/180, the preamble on a first set of resources and the payload on a second set of resources. UE 104 may receive a second message associated with completion of the RACH procedure 198. The second message may be transmitted by base station 102/180 in response to the first message. In accordance with certain aspects of the present disclosure, for the 4-step procedure, UE 104 may transmit a first message (msg1) to base station 102/180 to initiate the RACH procedure 198, the first message comprising a preamble. UE 104 may receive a second message (msg2) associated with a random access response. The second message may be transmitted by base station 102/180 in response to the first message. the second message may comprise a reduced payload size for timing advance. UE 104 may transmit a third message in response to the second message. The third message (msg3) may comprise information transmitted on an uplink shared channel. UE 104 may receive a fourth message (msg 4) associated with completion of the RACH procedure 198. The fourth message may be transmitted by base station 102/180 in response to the third message.

Base station 102/180 may be configured to send at least one system information block (SIB), RRC message, or combinations thereof, wherein the at least one SIB or RRC message includes configuration information associated with the RACH procedure 198 (e.g., for one or more two-step RACH procedures, one or more four-step RACH procedures, or combinations thereof). The base station 102/180 may receive, from the UE 104, the first message associated with initiation of the RACH procedure 198, and the preamble of the first message is received on a first set of resources and a payload of the first message is received on a second set of resources. The base station 102/180 may send, to the UE 104 based on the first message, a second message associated with completion of the RACH procedure 198, wherein the second message includes, for example, control information in a physical downlink control channel (PDCCH) and data in a physical downlink shared channel (PDSCH).

Figures 2A, 2B, 2C, 2D:
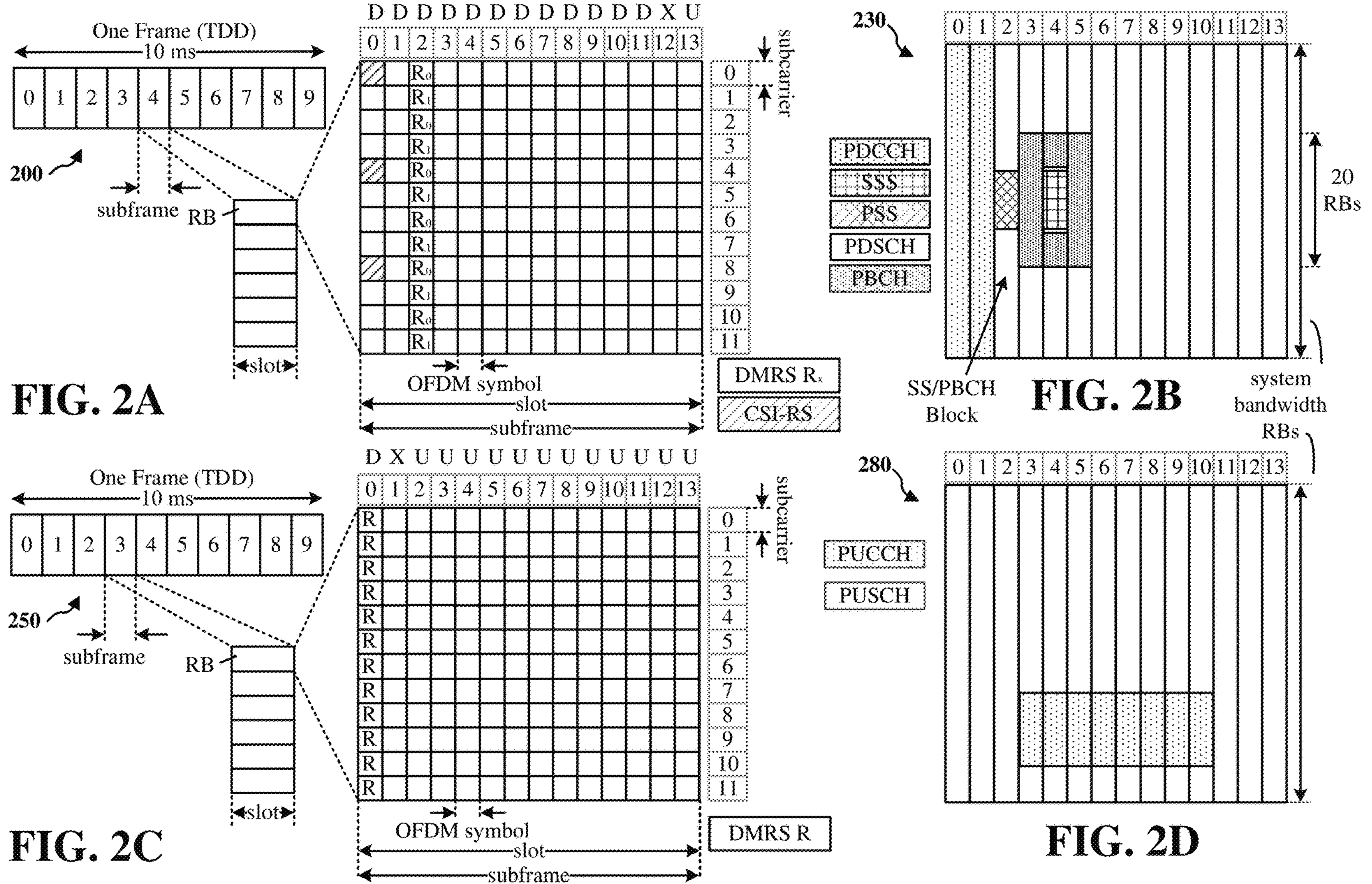
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with certain aspects of the present disclosure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling/messages) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kKz, where $\mu$ is the numerology 0 to 5. As such, the numerology $\mu=0$ has a subcarrier spacing of 15 kilohertz (kHz) and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as $R_x$ for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
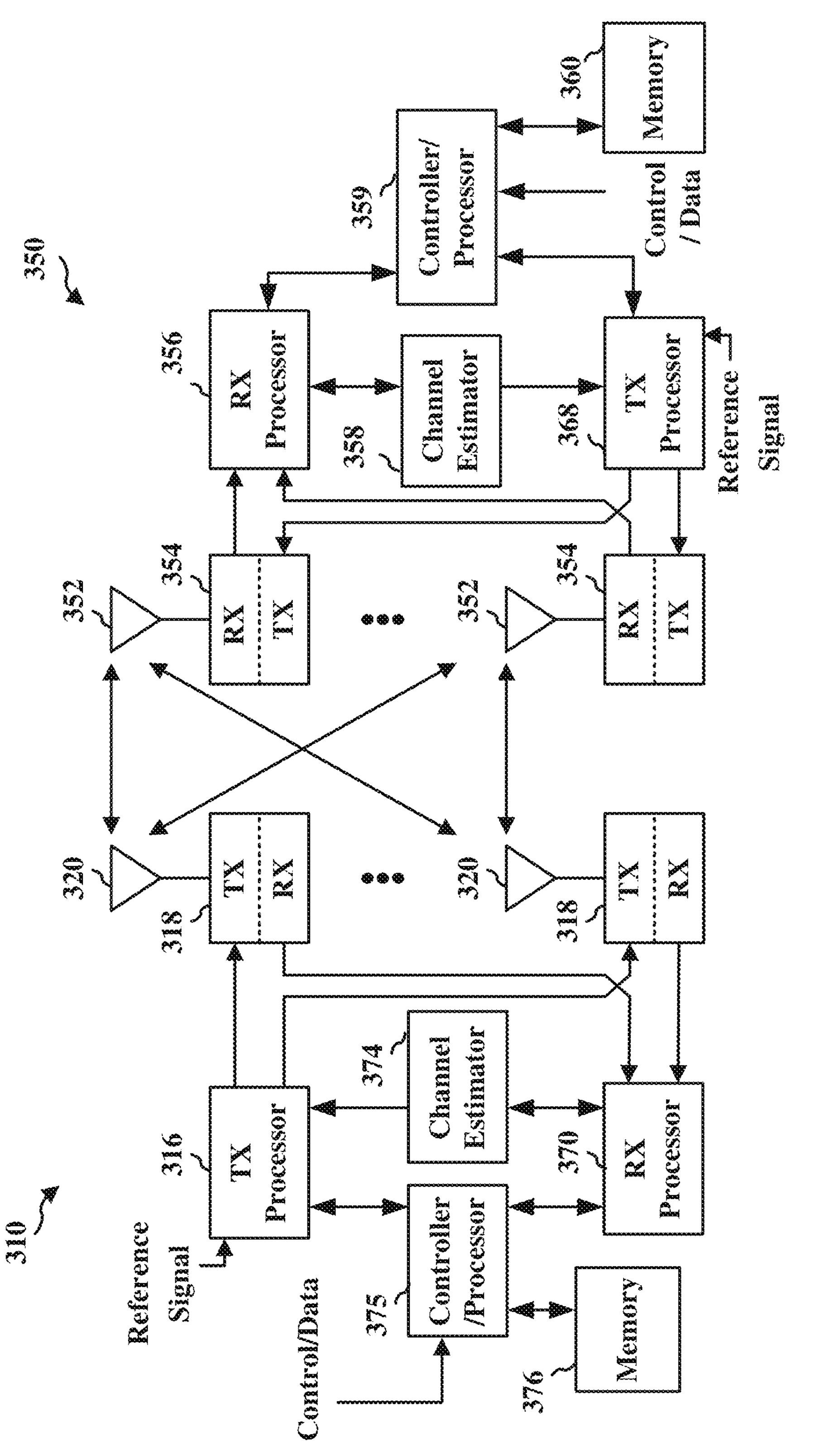
FIG. 3 is a diagram illustrating an example of a base station and user equipment (UE) in an access network, in accordance with certain aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
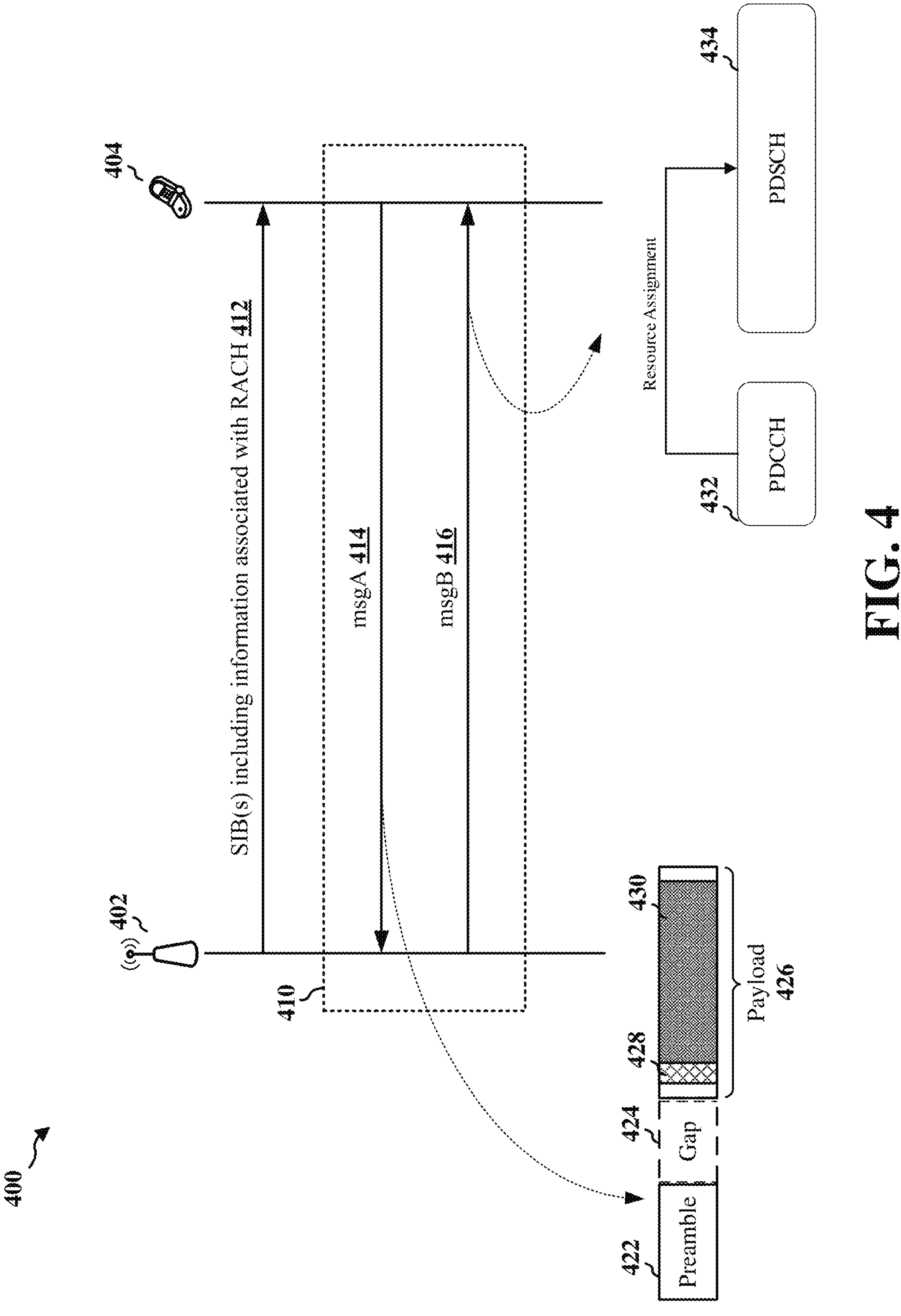
FIG. 4 is a call flow diagram of wireless communications system, in accordance with certain aspects of the present disclosure.

FIG. 4 is a call flow diagram illustrating a RACH procedure 410 in a wireless communications system 400. The wireless communications system 400 may include a base station 402 and a UE 404. The base station 402 may provide a cell, on which the UE 404 may operate. Aspects of the base station 402 may be described with respect to the base station 102 of FIG. 1, the gNB 180 of FIG. 1, and/or the base station 310 of FIG. 3. Aspects of the UE 404 may be described with respect to the UE 104 of FIG. 1 and/or the UE 350 of FIG. 3.

In order to communicate in the wireless communications system 400, the base station 402 and the UE 404 may acquire a timing advance for uplink signals. The base station 402 and the UE 404 may acquire timing synchronization (e.g., uplink timing synchronization) through RACH procedure 410. For example, the UE 404 may initiate the RACH procedure 410 for initial access to the cell provided by the base station 402, RRC connection reestablishment, handover from another base station to the base station 402, reacquisition of timing synchronization, transition from an RRC Inactive state, SCell timing alignment, request for Other System Information (SI), and/or beam failure recovery.

In the wireless communications system 400, the RACH procedure 410 may include the exchange of two messages, which may be referred to as "2-step RACH", "2-step RACH procedure", or "2-step random access". Specifically, the UE 404 may initiate the message exchange of the RACH procedure 410 by sending a first RACH message 414 to the base station 402 and, responsive to the first RACH message 414, the base station may complete the message exchange of the RACH procedure 410 by sending a second RACH response message 416 to the UE 404. In some aspects, the first RACH message 414 may be referred to as "msgA" and the second RACH response message 416 may be referred to as "msgB."

The RACH procedure 410 may be applicable to any size of the cell provided by the base station 402, all RRC states in which the UE 404 may operate, and/or whether or not the UE 404 has a valid timing advance (TA) (e.g., for adjustment of the timing of uplink transmission by the UE 404). The RACH procedure 410 may differ in some aspects from other RACH procedures, such as RACH procedures in which four messages are exchanged (e.g., "4-step RACH", "4-step RACH procedure", or "4-step random access"). However, some aspects may be common across the RACH procedure 410 and another RACH procedure (e.g., a 4-step RACH procedure). For example, sequences associated with physical RACH (PRACH) and sequences associated with DMRS used for a 4-step RACH procedure may also be used for the RACH procedure 410. Further, a TX chain used for a PUSCH in a 4-step RACH procedure may also be used for the RACH procedure 410.

The base station 402 may periodically send (e.g., broadcast) information associated with operating on the cell provided by the base station 402. As described with respect to FIG. 2B, supra, the base station 402 may send a MIB, one or more SIBs, and one or more RRC messages. At least one SIB 412 or RRC message may include configuration information associated with the RACH procedure 410. In one aspect, the at least one SIB 412 may indicate information associated with resource allocation(s) for the msgA 414, sequence configurations associated with a preamble 422 of the msgA 414, modulation and coding schemes (MCSs) associated with the msgA 414, transmission powers associated with the msgA 414, and/or other configuration information. The UE 404 may receive and decode the at least one SIB 412 and may subsequently perform the RACH procedure 410 based on the configuration information indicated by the at least one SIB 412.

To initiate the RACH procedure 410, the UE 404 may generate the msgA 414 (first message of 2-step RACH). For the RACH procedure 410, the UE 404 may generate the msgA 414 to include at least a PRACH preamble 422 and a payload 426. The payload 426 may include at least one DMRS 428 and data in a PUSCH 430. In some aspects, the msgA 414 may additionally include a gap 424 in time between the preamble 422 and the payload 426.

With reference to the PRACH preamble 422, the UE 404 may generate the preamble 422 based on at least one sequence, which may be described with respect to the length as a long sequence or a short sequence. The UE 404 may determine to use a long sequence or a short sequence based on one or more characteristics of the RACH procedure 410 with the base station 402, such as a bandwidth for the preamble 422, the numerology of the preamble 422, the size of the cell provided by the base station 402 (e.g., small cell or larger cell), an RRC state of the UE 404, and/or other characteristic(s). Illustratively, Table 1 shows PRACH preamble characteristics for a long sequence having a numerology that is different from that of the PUSCH in the payload, and occupying bandwidth of 1.08/4.32 MHz. Table 2 shows PRACH preamble characteristics for a short sequence having a numerology that is the same as that of the PUSCH in the payload, and occupying a bandwidth of twelve PRBs, e.g., for a frequency range (FR) 1 with 15 kHz/30 kHz subcarrier spacing (SCS) and occupying a bandwidth of 2.16/4.32 MHz.

TABLE 1

| Format | Numerology (kHz) | Number of Repetitions | CP length (μs) | Preamble length (not including CP) (μs) |
|---|---|---|---|---|
| 0 | 1.25 | 1 | ≈100 | 800 |
| 1 | 1.25 | 2 | ≈680 | 1600 |
| 2 | 1.25 | 4 | ≈15 | 3200 |
| 3 | 5 | 1 | ≈100 | 800 |

TABLE 2

| Format | Number of Repetitions | CP length (μs) | Preamble length (not including CP) (μs) |
|---|---|---|---|
| A1 | 2 | 9.4 | 133 |
| A2 | 4 | 18.7 | 267 |
| A3 | 6 | 28.1 | 400 |
| B1 | 2 | 7.0 | 133 |
| B2 | 4 | 11.7 | 267 |
| B3 | 6 | 126.4 | 400 |
| B4 | 12 | 30.5 | 800 |
| C0 | 1 | 40.4 | 66.7 |
| C2 | 4 | 66.7 | 267 |

Referring to the payload 426, the UE 404 may generate the payload 426 to include at least one DMRS 428 and data in a PUSCH 430. The at least one DMRS 428 may be associated with the PUSCH 430—e.g., the at least one DMRS 428 may be used by a receiver (e.g., the base station 402) for channel estimation when receiving the PUSCH 430.

For the payload 426, the UE 404 may determine a TB size and an MCS. In one aspect, the UE 404 may perform one or more downlink measurements (e.g., to measure channel quality, such as reference signal received power (RSRP)) and may determine a state of a buffer of the UE 404 (e.g., buffer occupancy status) and the QoS of buffered data. Based on the one or more downlink measurements and/or based on the buffer state, the UE 404 may determine the TB size and/or the MCS to be applied to the payload 426. For example, the UE 404 may adjust the TB size and/or the MCS according to the current channel conditions (indicated by the downlink measurement(s)) and/or according to the amount of uplink data the UE 404 is to send to the base station 402 in the PUSCH 430.

In another aspect, the UE 404 may determine the TB size and/or the MCS to be applied to the payload 426 based on the RRC state of the UE 404 and/or the size of the cell provided by the base station 402 on which the UE 404 operates. For example, the UE 404 may access a table (e.g., a lookup table) that indicates correspondence between each of a set of RRC states and/or cell sizes and a respective MCS and/or TB size to be applied for transmission of the payload 426. In various aspects, the table may be predefined in the UE 404 (e.g., stored according to a 3GPP standard) or may be signaled to the UE 404 from the base station 402 (e.g., in at least one SIB). Accordingly, the UE 404 may determine the current RRC state of the UE 404 and/or cell size provided by the base station 402, and then the UE 404 may refer to the table to determine the MCS and/or TB size that corresponds to the current RRC state and/or cell size. The UE 404 may then apply the determined MCS and/or TB size to the payload 426. With this variability, the UE 404 and base station 402 may benefit from a mechanism for indicating MCS, TB size, and/or payload size to the base station 402 by the UE 404.

With the preamble 422 sent separately from the payload 426, the preamble 422 may be used to indicate information about the payload 426 (e.g., the at least one DMRS 428 may provide channel estimation for the PUSCH 430, thus the preamble 422 may be used to convey information other than channel estimation). For example, the UE 404 may generate the preamble 422 and/or assign the preamble 422 to a first set of resources in order to indicate the size of the payload 426, the MCS applied to the payload 426, and/or the TB size used for the payload 426.

In one aspect, the UE 404 may generate the preamble 422 according to a sequence configuration that indicates the size of the payload 426, the TB size in the payload 426, and/or the MCS applied to the payload 426. The UE 404 may determine the size of the payload 426, TB size in the payload 426, and/or MCS, and the UE 404 may determine a sequence configuration that corresponds to the size of the payload 426, TB size, and/or the MCS. For example, the UE 404 may access a table (e.g., a lookup table) that indicates correspondence between a respective sequence configuration and a respective size of the payload 426, TB size, and/or MCS. The UE 404 may receive information (e.g., table) indicating a respective size of the payload 426, TB size, and/or MCS and a corresponding sequence configuration from the base station 402, such as in a SIB (e.g., the SIB 412).

In one aspect, the UE 404 may generate the preamble 422 to indicate the size of the payload 426, the TB size in the payload 426, and/or the MCS applied to the payload 426 based on one or more parameters used to generate the preamble 422. The one or more parameters may include a cyclic shift applied to a sequence, a root sequence index used for generation of a sequence, another parameter, and/or a combination of parameters (e.g., a combination of a cyclic shift and a root index). Thus, at least a portion of each possible sequence that the UE 404 may generate for the preamble 422 may correspond to at least one of the size of the payload 426, the TB size in the payload 426, and/or the MCS applied to the payload 426. Accordingly, the UE 404 may generate a sequence that corresponds to the at least one of the size of the payload 426, the TB size in the payload 426, and/or the MCS applied to the payload 426. By using a corresponding sequence in the preamble 422, the UE 404 may indicate at least one of the size of the payload 426, the TB size, and/or the MCS to the base station 402.

In one aspect, the UE 404 may additionally determine a sequence configuration based on an RRC state of the UE 404 and/or a size of the cell on which the UE 404 is operating. For example, the UE 404 may use a short sequence (e.g., length 139) and/or a relatively larger SCS (e.g., 15/30 kHz) when the UE 404 is operating on a small cell and/or when the UE 404 is operating in an RRC Connected state. In another example, the UE 404 may use a long sequence (e.g., length 839) and/or a relatively smaller SCS (e.g., 1.25/5/7.5 kHz) when the UE 404 is operating on a larger cell (e.g., macro cell) and/or when the UE 404 is operating in an RRC Inactive or RRC Idle state.

With multiple UEs using sequences in preambles to indicate sizes of payloads, TB sizes in payloads, and/or MCSs applied to payloads, the probability of collisions may increase—that is, the base station 402 may be more likely to receive two identical preambles from two different UEs. In order to reduce the probability of preamble collision, "composite" preambles may be used to increase the pool of available preambles for msgA from different UEs. A composite preamble may include at least two sequences, which may be concatenated in time/frequency (e.g., by OCC).

For example, the UE 404 may generate the preamble 422 by generating a first sequence and generating at least one second sequence. The UE 404 may concatenate the first sequence and the at least one second sequence to form the preamble 422. The UE 404 may then send the preamble 422 (including the first sequence concatenated with the at least one second sequence) to the base station 402 by multiplexing the first sequence and the at least one second sequence. The UE 404 may time-division multiplex, frequency-division multiplex, and/or space-division multiplex the first sequence and the at least one second sequence to differentiate the sequences when received by the base station 402.

In some aspects, the UE 404 may indicate at least one of the size of the payload 426, the TB size in the payload 426, and/or the MCS applied to the payload 426 using a composite sequence. For example, the combination of the first sequence and the at least one second sequence may indicate at least one of the size of the payload 426, TB size, and/or MCS. In another example, each of the individual first sequence and at least one second sequence may indicate one or more of the size of the payload 426, TB size, and/or MCS.

The UE 404 may assign the preamble 422 to a first set of resources for transmission to the base station 402. In one aspect, the UE 404 may determine the first set of resources based on at least one of the size of the payload 426, the TB size in the payload 426, and/or the MCS applied to the payload 426. Accordingly, the first set of resources to which the preamble 422 is assigned may indicate the at least one of the size of the payload 426, the TB size in the payload 426, and/or the MCS applied to the payload 426 when the base station 402 receives the preamble 422.

In one aspect, the UE 404 may determine the first set of resources based on information that indicates correspondence between sets of resources and the at least one of the size of the payload 426, the TB size in the payload 426, and/or the MCS applied to the payload 426. For example, the UE 404 may access a table (e.g., a lookup table) that indicates the correspondence between sets of resources and the at least one of the size of the payload 426, TB size, and/or MCS. In various aspects, the information (e.g., table)

may be predefined in the UE 404 (e.g., stored according to a 3GPP standard) or may be signaled to the UE 404 from the base station 402 (e.g., in at least one SIB).

With the preamble 422 separate from the payload 426, the UE 404 may assign the payload 426 to a second set of resources. The second set of resources may be based on a size of the cell on which the UE 404 is operating and/or the RRC state in which the UE 404 is operating. Accordingly, the UE 404 may determine at least one of the cell size of the base station 402 and/or the RRC state of the UE 404, and the UE 404 may determine a second set of resources that corresponds to the at least one of the cell size of the base station 402 and/or the RRC state of the UE 404.

In one aspect, the UE 404 may determine the second set of resources based on information that indicates correspondence between sets of resources and the at least one of the size of the cell on which the UE 404 is operating and/or the RRC state in which the UE 404 is operating. For example, the UE 404 may access a table (e.g., a lookup table) that indicates the correspondence between sets of resources and the at least one of the size of the cell on which the UE 404 is operating and/or the RRC state in which the UE 404 is operating. In another example, the second set of resources may be a function (e.g., mathematical function) of the at least one of the size of the cell on which the UE 404 is operating and/or the RRC state in which the UE 404 is operating. The UE 404 may evaluate the function with the cell size and RRC state as inputs in order to obtain the second set of resources. In various aspects, the information (e.g., table, function, etc.) may be predefined in the UE 404 (e.g., stored according to a 3GPP standard) or may be signaled to the UE 404 from the base station 402 (e.g., in at least one SIB).

The UE 404 may be identified by the base station 402 according to an identifier (ID) of the UE 404, such as a radio network temporary identifier (RNTI) (e.g., a random access (RA) RNTI, a temporary RNTI, etc.). The msgA 414 may be the first transmission by the UE 404 to the base station 402 and, therefore, the base station 402 may benefit from a mechanism for indicating the ID of the UE 404 to the base station 402 in the msgA 414, particularly because the msgA 414 may include data from the UE 404 in the payload 426. Accordingly, the UE 404 may indicate an ID of the UE 404 using one or more (or a combination of) approaches for including information in the msgA 414.

In one aspect, the UE 404 may indicate an ID of the UE 404 based on the sequence of the preamble 422. For example, a sequence index used by the UE 404 for generating the sequence of the preamble 422 may indicate the ID of the UE 404. In one aspect, different root sequence indexes may correspond to different IDs or different bits of an ID. The UE 404 may determine an ID of the UE 404, and the UE 404 may determine a root sequence index for generating the preamble 422 based on the ID of the UE 404. The UE 404 may access information that indicates correspondence between ID information (e.g., sets of bits) and the different root sequence indexes. For example, the UE 404 may access a table (e.g., a lookup table) that indicates the correspondence between ID information (e.g., sets of bits) and the different root sequence indexes. The UE 404 may generate a sequence for the preamble 422 from a root sequence index that corresponds to the ID information to be conveyed by the UE 404 to the base station 402.

In another aspect, the UE 404 may indicate an ID of the UE 404 based on a composite sequence of the preamble 422. For example, a combination of sequences and/or a combination of sequence parameters (e.g., cyclic shifts, root sequence indexes, etc.) used by the UE 404 for the composite sequence of the preamble 422 may indicate ID information (e.g., a set of bits) of the UE 404. The UE 404 may access information that indicates correspondence between ID information (e.g., sets of bits) and composite sequences. Accordingly, the UE 404 may generate a composite sequence for the preamble 422 that corresponds to ID information to be conveyed by the UE 404 to the base station 402.

In one aspect, the UE 404 may indicate an ID of the UE 404 based on the sequence of the at least one DMRS 428. For example, a DMRS sequence index used by the UE 404 for generating the at least one DMRS 428 may indicate the ID of the UE 404. In one aspect, different DMRS sequence indexes may correspond to different IDs or different bits of an ID. The UE 404 may determine an ID of the UE 404, and the UE 404 may determine a DMRS sequence index for generating the at least one DMRS 428 based on the ID of the UE 404. The UE 404 may access information that indicates correspondence between ID information (e.g., sets of bits) and the different DMRS sequence indexes. For example, the UE 404 may access a table (e.g., a lookup table) that indicates the correspondence between ID information (e.g., sets of bits) and the different DMRS sequence indexes. The UE 404 may generate a sequence for the at least one DMRS 428 from a DMRS sequence index that corresponds to the ID information to be conveyed by the UE 404 to the base station 402.

In another aspect, the UE 404 may indicate an ID of the UE 404 using a portion of the bits in the payload 426. For example, a portion of the bits of the payload 426 may be reserved for indicating ID information associated with the UE 404. Accordingly, the UE 404 may set the portion of the bits in the payload 426 to values indicating at least a portion of the ID information associated with the UE 404.

In another aspect, the UE 404 may indicate an ID of the UE 404 using a scrambling code that is used to scramble the payload 426. For example, a scrambling code used by the UE 404 for scrambling the payload 426 may indicate the ID of the UE 404. In one aspect, different scrambling codes may correspond to different IDs or different bits of an ID. The UE 404 may determine an ID of the UE 404, and the UE 404 may determine a scrambling code for scrambling the payload 426 based on the ID of the UE 404. The UE 404 may then use the determined scrambling code for scrambling the payload 426 in order to indicate ID information (e.g., a set of bits of the ID of the UE 404) associated with the UE 404 to the base station 402.

In another aspect, the UE 404 may indicate an ID of the UE 404 using a cyclic redundancy check (CRC) mask. For example, a mask used by the UE 404 for masking the CRC included in the msgA 414 may indicate the ID of the UE 404. In one aspect, different CRC masks may correspond to different IDs or different bits of an ID. The UE 404 may determine an ID of the UE 404, and the UE 404 may determine a mask used by the UE 404 for masking the CRC included in the msgA 414 based on the ID of the UE 404. The UE 404 may then mask the CRC included in the msgA 414 using the determined CRC mask in order to indicate ID information (e.g., a set of bits of the ID of the UE 404) associated with the UE 404 to the base station 402.

In one aspect, the UE 404 may use a combination of two or more of the aforementioned techniques for conveying ID information in order to indicate an ID of the UE 404 to the base station 402. For example, a root sequence index used for generation of the sequence for the preamble 422 may indicate a first set of bits and a second set of bits may be indicated in the payload 426. The base station 402 may combine the first set of bits and the second set of bits in order to obtain the full ID of the UE 404.

With the generated preamble 422 and the generated payload 426, the UE 404 may send the msgA 414 to the base station 402. The UE 404 may send the msgA 414 by first sending the preamble 422 and then sending the payload 426. When the UE 404 sends the payload 426, the DMRS 428 and the PUSCH 430 may be in the same slot and may have the same bandwidth.

The UE 404 may send the payload 426 of the msgA 414 with or without frequency hopping in the PUSCH 430. With or without hopping in the PUSCH 430, the UE 404 may frontload a first of the at least one DMRS 428. Specifically, the UE 404 may assign the first of the at least one DMRS 428 to one of two possible locations: the first OFDM symbol or the third/fourth symbol of the slot in which the first of the at least one DMRS 428 and the PUSCH 430 are sent.

The UE 404 may assign the at least one DMRS 428 to one or more symbols that are the same for the PUSCH 430 with CP-OFDM and DFT-s-OFDM without frequency hopping. In one aspect, the UE 404 may frontload the at least one DMRS 428 according to a DMRS configuration type 1, which may support up to eight ports. With DMRS configuration type 1, the at least one DMRS 428 may be assigned to resource(s) with an interleaved frequency division multiplexing (IFDM)-based pattern having a Comb-2 pattern with CSs, assigned to one OFDM symbol having a Comb-2 pattern with two CSs for up to four ports, and/or assigned to two OFDM symbols having a Comb-2 pattern with two CSs and time domain (TD) orthogonal cover code (OCC) (TD-OCC) ({1 1} and {1 −1}) for up to eight ports. When the number of ports for the at least one DMRS 428 is less than or equal to four, the number of frontloaded DMRS symbols may be one or two. For the at least one DMRS 428 for CP-OFDM with extended CP (e.g., at least 60 kHz SCS), the DMRS configuration type 1 as with normal CP may be supported. In some cases, the OCC can be applied in both time and frequency domain to enlarge the pool size of DMRS.

In another aspect, the UE 404 may frontload the at least one DMRS 428 according to configuration type 2, which may support up to twelve ports. With DMRS configuration type 2, the at least one DMRS 428 may be assigned according to a frequency domain (FD) OCC (FD-OCC) pattern with adjacent REs in the frequency domain With one OFDM symbol for the at least one DMRS 428, the at least one DMRS 428 may be assigned according to 2-FD-OCC across adjacent REs in the frequency domain for up to six ports. With two OFDM symbols for the at least one DMRS 428, the at least one DMRS 428 may be assigned according to 2-FD-OCC across adjacent REs in the frequency domain and TD-OCC (both {1 1} and {1 −1}) for up to twelve ports. When the number of ports for the at least one DMRS 428 is less than or equal to six, the number of frontloaded DMRS symbols may be one or two. In some cases, the OCC can be applied in both time and frequency domain to enlarge the pool size of DMRS.

As illustrated, the UE 404 may insert a gap 424 in time when sending the msgA 414. The time duration of the gap 424 is configurable, which can be zero, a fraction of an OFDM symbol, or several OFDM symbols. The gap 424 may facilitate transmission of the msgA 414 when the preamble 422 and the payload 426 differ in various ways. In one aspect, the UE 404 may transmit the msgA 414 so that the preamble 422 occupies a different bandwidth portion than the payload 426 (although the bandwidth portion occupied by the preamble 422 may at least partially overlap with the bandwidth portion occupied by the payload 426). For example, the preamble 422 may occupy a relatively smaller bandwidth than the payload 426. In another aspect, the UE 404 may transmit the msgA 414 so that the preamble 422 has a different numerology than the payload 426. For example, the UE 404 may transmit the msgA 414 so that the SCS and/or sampling rate of the preamble 422 is different from that of the payload 426. In still another aspect, the UE 404 may transmit the msgA 414 so that the preamble 422 is transmitted on a beam that is different than a beam on which the payload 426 is transmitted.

In a further aspect, the UE 404 may transmit the msgA 414 so that the preamble 422 is transmitted with a different transmission power than the payload 426—e.g., the UE 404 may implement different power control schemes for the transmission of the preamble 422 and the transmission of the payload 426. For example, the UE 404 may transmit the preamble 422 according to a power scheme that power ramps or increases transmission power as the preamble 422 is transmitted, whereas the UE 404 may transmit the payload 426 with a power control scheme that is based on an MCS applied to the payload 426 (e.g., an MCS-dependent power control scheme, which may be inapplicable to the preamble 422 because the preamble 422 does not include data).

The base station 402 may receive the msgA 414 from the UE 404 in order to initiate the RACH procedure 410. The base station 402 may receive the preamble 422 on the first set of resources. Accordingly, the base station 402 may determine at least one of a size of the payload 426, a TB size in the payload 426, and/or an MCS applied to the payload 426 based on receiving the preamble 422. For example, the base station 402 may access information indicating a correspondence between sequence configurations and/or sets of resources and at least one of payload sizes, TB sizes, and/or MCSs. As described, supra, the sequence configuration of the preamble 422 and/or the first set of resources may indicate the at least one of the size of the payload 426, TB size, and/or MCS. Based on the information indicating the correspondence, the base station 402 may determine the at least one of the size of the payload 426, TB size, and/or MCS.

Based on the preamble 422, the base station 402 may receive and decode the payload 426. In some aspects, the gap 424 in time may facilitate the decoding by the base station 402, e.g., by allowing the base station 402 a period of time to adjust a processing window to correspond to the TB size, adjust the data rate to correspond to the MCS, allocate processing time for a size of the payload 426, etc.

Further, in order to identify the source of the msgA 414, the base station 402 may determine the ID of the UE 404. The base station 402 may determine the ID of the UE 404 based on one or more of (or a combination of) a preamble sequence index associated with the preamble 422, a DMRS sequence index associated with the at least one DMRS 428 in the payload 426, a subset set of a set of bits in the payload 426, a scrambling code applied to the payload, and/or a mask applied to a CRC included in the msgA 414.

In response to the msgA 414, the base station 402 may generate a msgB 416 (second message of 2-step RACH). The base station 402 may generate the msgB 416 to include, e.g., control information in a PDCCH (432) and, e.g., data in a PDSCH (434). The PDCCH may include resource assignment for the PDSCH. The base station 402 may send the msgB 416 to the UE 404 to complete the RACH procedure 410. The UE 404 may receive the msgB 416, and the UE 404 may acquire timing synchronization based on the msgB 416.

Figure 5:
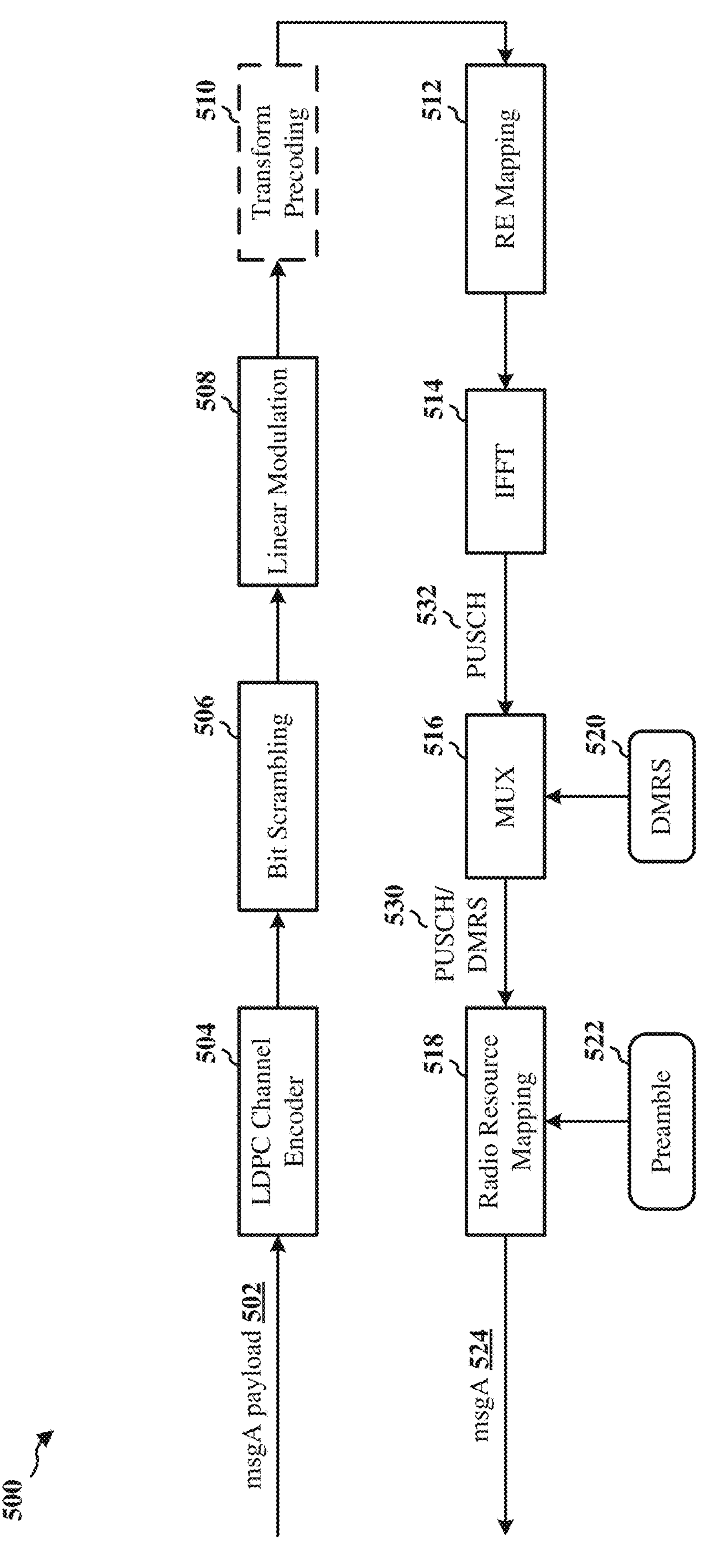
FIG. 5 is a block diagram of a transmit chain for a message of a random access channel procedure, in accordance with certain aspects of the present disclosure.

FIG. 5 illustrates a TX chain 500 associated with transmission of a msgA 524 from a UE to a base station. For example, the msgA 524 may be the msgA 414 sent by the UE 404 to the base station 402, as illustrated in FIG. 4. A UE may generate a payload 502 of a msgA. The payload 502 may include uplink data to be transmitted by the UE to a base station. For example, the payload 502 may include data retrieved from a buffer of the UE. The payload 502 may be provided to the TX chain 500 for transmission to the base station.

In the TX chain 500, a low-density parity-check (LDPC) channel encoder 504 may generate and apply error correcting code to the payload 502. Further, bit scrambling 506 may be applied to the payload 502 in order to provide a level of encryption to the payload 502.

The payload 502 may be modulated with linear modulation 508 to generate a waveform for the payload 502. Optionally, transform precoding 510 may be applied if enabled, which may generate complex-valued symbols for the payload 502. Next, the payload 502 may be mapped to REs on a grid according to RE mapping 512. An IFFT 514 may be applied to produce a PUSCH 532 carrying a time domain OFDM symbol stream for the payload 502.

A multiplexer (MUX) 516 may then multiplex the PUSCH 532 (carrying the payload 502) with at least one DMRS 520 in the time and/or frequency domain, e.g., to provide for channel estimation. In some aspects, the PUSCH/DMRS 530 may be assigned to TBs and an MCS may be applied thereto. The MCS and the size of the TBs may be configured based on an RRC state in which the UE is operating and/or based on a size of the cell on which the UE is operating. For example, a table (e.g., a lookup table) may indicate a respective TB size/MCS configuration for each RRC state and/or cell size and, according to the RRC state of the UE and/or cell size, the TB size and MCS for the PUSCH/DMRS 530 may be configured. The PUSCH/DMRS 530 may be provided for radio resource mapping 518.

A preamble 522 may be generated in association with the PUSCH/DMRS 530. In one aspect, the preamble 522 may be generated based on the PUSCH/DMRS 530. For example, the preamble 522 may be generated based on a sequence configuration that corresponds to the TB size, MCS, and/or size of the payload 502. In some aspects, the sequence configuration may include a cyclic shift, root sequence index, and/or combination thereof for generation of the preamble 522 that corresponds to at least one of the TB size, MCS, and/or size of the payload 502. The sequence configuration may be signaled to the UE in a SIB.

In some aspects, the preamble 522 may be comprised of a plurality of sequences. For example, multiple sequences may be concatenated in the time and/or frequency domain (e.g., by OCC) to construct a "composite" preamble. Each of the individual sequences may be generated using a root sequence index and cyclic shift(s), and then the individual sequences may be time-division multiplexed, frequency-division multiplexed, and/or space-division multiplexed.

At the radio resource mapping 518, the preamble 522 may be assigned to a first set of resources. The first set of resources may be allocated based on the PUSCH/DMRS 530. For example, the first set of resources may be allocated for the preamble 522 based on at least one of the TB size, MCS, and/or size of the payload 502. The first set of resources on which the preamble 522 is carried may correspond to at least one of the TB size, MCS, and/or size of the payload 502 and, therefore, the first set of resources may indicate the at least one of the TB size, MCS, and/or size of the payload 502. The corresponding resource allocation for the first set of resources to indicate the at least one of the TB size, MCS, and/or size of the payload 502 may be signaled to the UE in a SIB.

Further at the radio resource mapping 518, the PUSCH/DMRS 530 may be mapped to a second set of resources, which may be allocated based on a size of a cell on which the UE is operating and/or based on an RRC state in which the UE is operating. In some aspects, the resource allocation for the second set of resources may be signaled by a SIB from a base station to the UE, may be predefined by a math function, or may be predefined by a table (e.g., lookup table) with respect to the preamble 522.

The preamble 522 and the PUSCH/DMRS 530 (carrying the payload 502) may be time-division multiplexed so that the preamble 522 is transmitted on the first set of resources before the PUSCH/DMRS 530 on the second set of resources. In some aspects, a gap in time may be inserted between the preamble 522 and the PUSCH/DMRS 530 at the radio resource mapping 518.

In the aggregate, the preamble 522 and PUSCH/DMRS 530 (and optional gap) may comprise the msgA 524 of a RACH procedure (e.g., 2-step RACH). Subsequently, the TX chain 500 may apply the signal representing the preamble 522 to an antenna for transmission on the first set of resources and may apply the signal representing the PUSCH/DMRS 530 to the antenna for transmission on the second set of resources. In some aspects, different power control schemes may be used for transmission of the preamble 522 and the PUSCH/DMRS 530 of the msgA 524. For example, a power ramping scheme may be applied for transmission of the preamble 522, whereas an MCS-dependent power control scheme may be applied for transmission of the PUSCH/DMRS 530 (in which the payload 502 is carried).

In some aspects, the preamble 522 may occupy a different bandwidth portion than the PUSCH/DMRS. In addition, the preamble 522 may be transmitted on a different beam than the PUSCH/DMRS 530. Further, the numerology and SCS with which the preamble 522 is transmitted may be different than that with which the PUSCH/DMRS 530 is transmitted.

Figure 6:
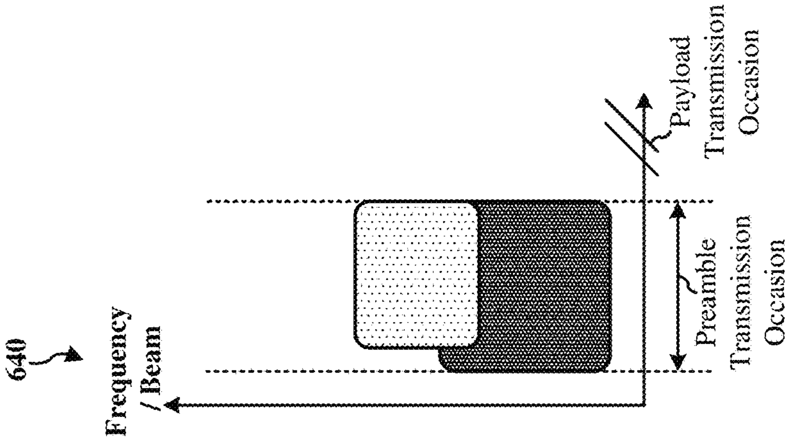
FIG. 6 is a block diagram of resource allocations and sequence configurations for preambles of random access channel procedures, in accordance with certain aspects of the present disclosure.
Figure 6:
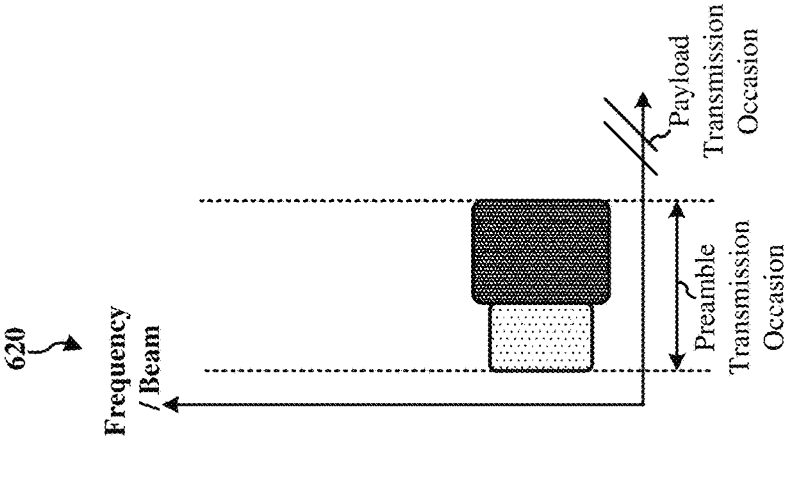
Figure 6:
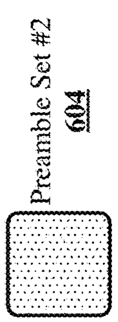
Figure 6:
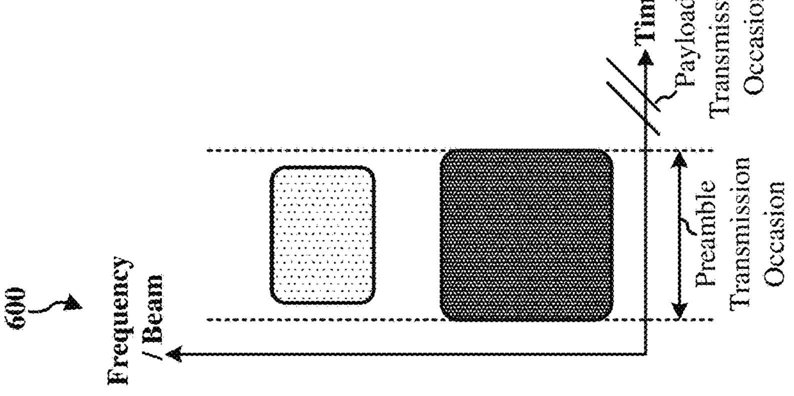
Figure 6:
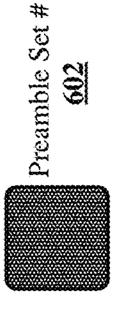

Turning to FIG. 6, a block diagram illustrates example resource allocations and sequence configurations for preambles transmitted by UEs in RACH procedures (e.g., 2-step RACH procedures). In various aspects, two preamble sets 602, 604 may be transmitted (e.g., by different UEs)—e.g., a preamble set may include a set of sequences, such as a set of sequences generated according to a root sequence index within a first range and/or a number of cyclic shifts within a second range. The first preamble set 602 may be associated with a first TB size/MCS configuration, whereas the second preamble set 604 may be associated with a second TB size/MCS configuration. For example, a preamble corresponding to the first preamble set 602 may be used by UEs to indicate a msgA includes a payload having a first TB size and first MCS, whereas a preamble corresponding to the second preamble set 604 may be used by other UEs to indicate a msgA includes a payload having a second TB size and a second MCS.

A UE (e.g., the UE 404) may transmit a preamble (e.g., the preamble 422) corresponding to the first preamble set 602 or the second preamble set 604 during a preamble transmission occasion, which may be followed in time (e.g., after an optional gap) by a payload transmission occasion during which the UE may transmit a payload (e.g., the payload 426). The UE may transmit a msgA (e.g., the msgA 414) for a RACH procedure (e.g., the RACH procedure 410) by transmitting the preamble in the preamble transmission occasion and transmitting the payload in the payload transmission occasion.

According to a first configuration 600, the first preamble set 602 may be separated from the second preamble set 604 by frequency and/or space/beam but may at least partially overlap in time. For example, a preamble of the first preamble set 602 may be time-division multiplexed on a wireless channel with a preamble of the second preamble set 604. In some aspects, a preamble of the first preamble set 602 may be carried in a first set of subcarriers, whereas a preamble of the second preamble set 604 may be carried in a second set of subcarriers that does not overlap with the first set of subcarriers. However, a preamble of the first preamble set 602 may be carried in a first set of set of symbols occurring during a first portion of the preamble transmission occasion, and a preamble of the second preamble set 604 may be carried in a second set of symbols occurring at least partially in the first portion of the preamble transmission occasion. Thus, in order to indicate the first TB size and first MCS, a UE would assign a preamble to a first set of REs comprised of the first set of subcarriers and the first set of symbols. Similarly, in order to indicate the second TB size and second MCS, a UE would assign a preamble to a second set of REs comprised of the second set of subcarriers and the second set of symbols. Because preambles of the first preamble set 602 may be distinguishable from those of the second preamble set 604 based on subcarrier allocation, the sequence configurations for the first preamble set 602 may at least partially overlap with that of the second preamble set 604 (e.g., a preamble generated for the first preamble set 602 may be the same as a preamble generated for the second preamble set 604).

According to a second configuration 620, the first preamble set 602 may be separated from the second preamble set 604 in time but may at least partially overlap in frequency and/or space/beam. For example, a preamble of the first preamble set 602 may be frequency-division multiplexed on a wireless channel with a preamble of the second preamble set 604. In some aspects, a preamble of the first preamble set 602 may be carried in a first set of subcarriers, and a preamble of the second preamble set 604 may be at least partially carried in the first set of subcarriers. However, a preamble of the first preamble set 602 may be carried in a first set of set of symbols during a first portion of the preamble transmission occasion, whereas a preamble of the second preamble set 604 may be carried in a second set of symbols during a second portion of the preamble transmission occasion that does not overlap with the first portion. Thus, in order to indicate the first TB size and first MCS, a UE would generate a preamble of the first preamble set 602 and/or assign a preamble to a first set of REs comprised of the first set of subcarriers and the first set of symbols. Similarly, in order to indicate the second TB size and second MCS, a UE would generate a preamble of the second preamble set 604 and/or assign a preamble to a second set of REs comprised of the second set of subcarriers and the second set of symbols. Because preambles of the first preamble set 602 may be distinguishable from those of the second preamble set 604 based on symbol allocation, the sequence configurations for the first preamble set 602 may at least partially overlap with that of the second preamble set 604 (e.g., a preamble generated for the first preamble set 602 may be the same as a preamble generated for the second preamble set 604).

According to a third configuration 640, the first preamble set 602 may be separated from the second preamble set 604 by sequence configuration, but may at least partially overlap in time and in frequency and/or space/beam. For example, a preamble of the first preamble set 602 may be code-division multiplexed on a wireless channel with a preamble of the second preamble set 604. In some aspects, a preamble of the first preamble set 602 may be generated according to a first set of RACH parameters, such as a first root sequence index and/or a first number of cyclic shifts. However, preambles of the second preamble set 604 may be generated according to a second set of RACH parameters that includes a different root sequence index and/or a different number of cyclic shifts. Because preambles are distinguishable based on whether the preamble was generated according to the sequence configuration for the first preamble set 602 or the second preamble set 604, preambles of the first preamble set 602 and the second preamble set 604 may overlap in time and/or frequency or space/beam. Thus, a preamble of the first preamble set 602 may occur on a first set of time/frequency resources, and a preamble of the second preamble set 604 may also occur at least partially on the first set of time/frequency resources. In order to indicate the first TB size and first MCS, a UE would generate a preamble according to the sequence configuration of the first preamble set 602. Similarly, in order to indicate the second TB size and second MCS, a UE would generate a preamble according to the sequence configuration of the second preamble set 604. Because preambles of the first preamble set 602 may be distinguishable from those of the second preamble set 604 based on their respective sequence configurations, the time/frequency resources allocated for the first preamble set 602 may at least partially overlap with those allocation for the second preamble set 604 (e.g., a preamble generated for the first preamble set 602 may be allocated resources that at least partially overlap with resources allocated for a preamble generated for the second preamble set 604).

Figure 7:
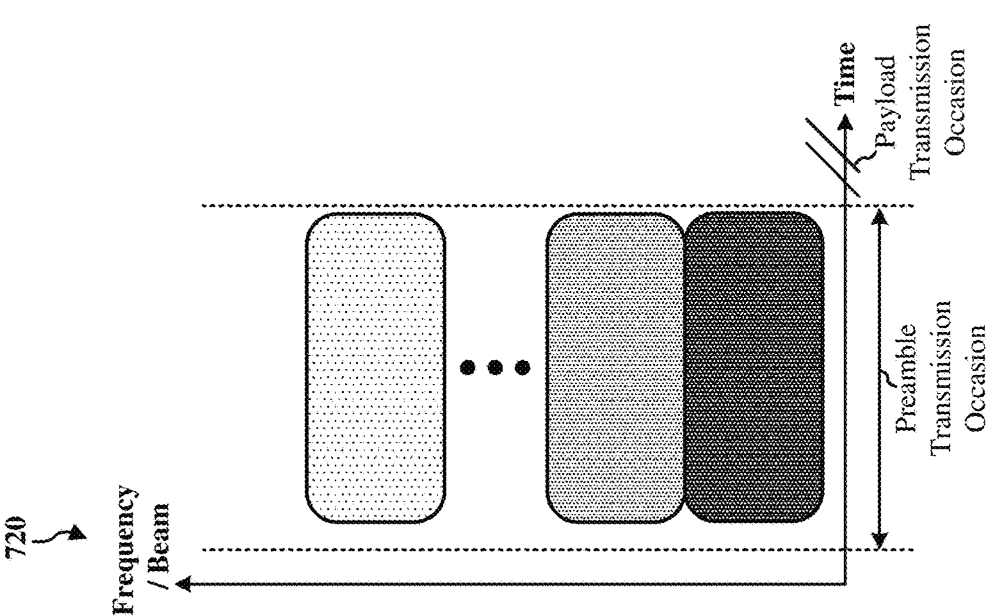
FIG. 7 is a block diagram of composite preambles for messages of random access channel procedures, in accordance with certain aspects of the present disclosure.
Figure 7:
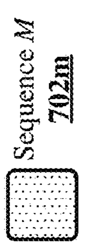
Figure 7:
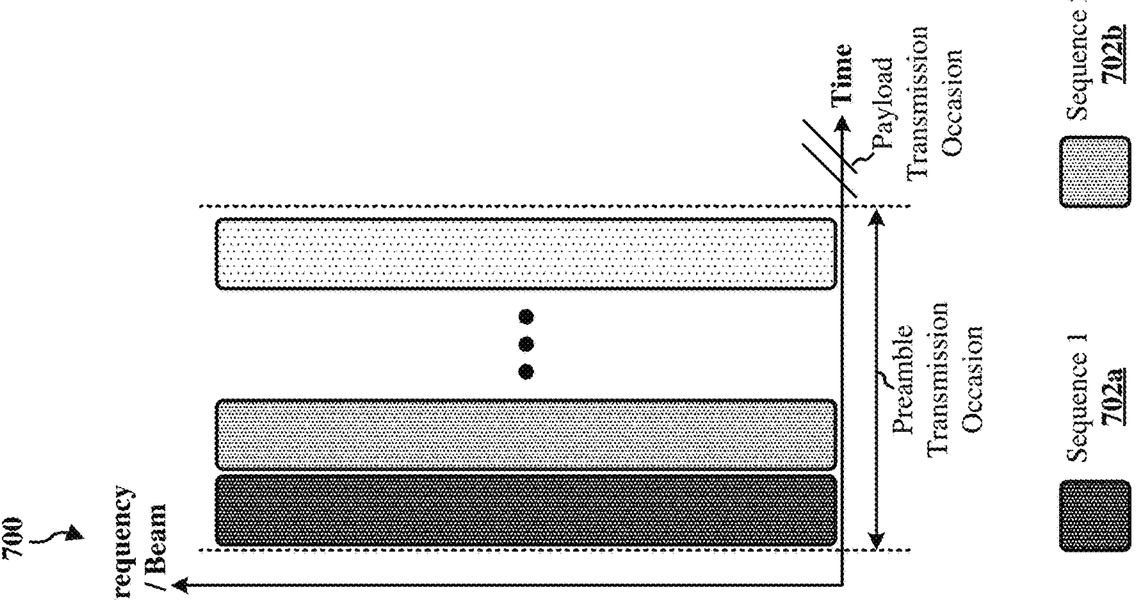

FIG. 7 illustrates an example block diagram of configurations 700, 720 of composite sequences. In the context of FIG. 4, the UE 404 may generate the preamble 422 to include a plurality of sequences **702*a*, 702*b*, 702*m*. The UE 404 may then transmit the msgA 414 including the plurality of sequences 702*a*, 702*b*, 702*m* as the preamble 422 during the preamble transmission occasion. Following transmission of the preamble 422, the UE 404 may transmit the payload 426** during the payload transmission occasion.

According to the first configuration 700, a UE may generate three sequences **702*a*, 702*b*, 702*m*. The sequences 702*a*, 702*b*, 702*m* may be respectively generated according to three different sequence configurations—e.g., three different sequence configurations that differ with respect to at least one of a root sequence index and/or a number of cyclic shifts. The UE may concatenate the sequences 702*a*, 702*b*, 702*m*, e.g., using OCC. To distinguish the sequences 702*a*, 702*b*, 702*m* from one another, the UE may time-division multiplex the sequences 702*a*, 702*b*, 702*m*. Accordingly, the UE may transmit a first sequence 702*a* during a first portion of the preamble transmission occasion, a second sequence 702*b* during a second portion of the preamble transmission occasion, and an $m^{th}$ sequence 702*m* during an $m^{th}$ portion of the preamble transmission occasion. In some aspects, the sequences 702*a*, 702*b*, 702*m*** may occupy the same set of subcarriers and/or may be transmitted on the same beam(s).

A UE may generate three sequences 702$a$, 702$b$, 702$m$. The sequences 702$a$, 702$b$, 702$m$ may be respectively generated according to the same sequence configuration or different sequence configurations—e.g., sequence configurations that differ with respect to at least one of a root sequence index and/or a number of cyclic shifts. The UE may concatenate the sequences 702$a$, 702$b$, 702$m$, e.g., using OCC.

According to the first configuration 700, to distinguish the sequences 702$a$, 702$b$, 702$m$ from one another, the UE may time-division multiplex the sequences 702$a$, 702$b$, 702$m$. Accordingly, the UE may transmit a first sequence 702$a$ during a first portion of the preamble transmission occasion, a second sequence 702$b$ during a second portion of the preamble transmission occasion, and an $m^{th}$ sequence 702$m$ during an $m^{th}$ portion of the preamble transmission occasion. In some aspects, the sequences 702$a$, 702$b$, 702$m$ may occupy the same set of subcarriers and/or may be transmitted on the same beam(s).

According to the second configuration 720, to distinguish the sequences 702$a$, 702$b$, 702$m$ from one another, the UE may frequency-division multiplex and/or space-division multiplex the sequences 702$a$, 702$b$, 702$m$. Accordingly, the UE may transmit a first sequence 702$a$ in a first set of subcarriers and/or on a first beam, a second sequence 702$b$ in a second set of subcarriers and/or on a second beam, and an $m^{th}$ sequence 702$m$ in an $m^{th}$ set of subcarriers and/or on an $m^{th}$ beam. In some aspects, sequences 702$a$, 702$b$, 702$m$ may at least partially occur during the same time during the preamble transmission occasion.

Figure 8:
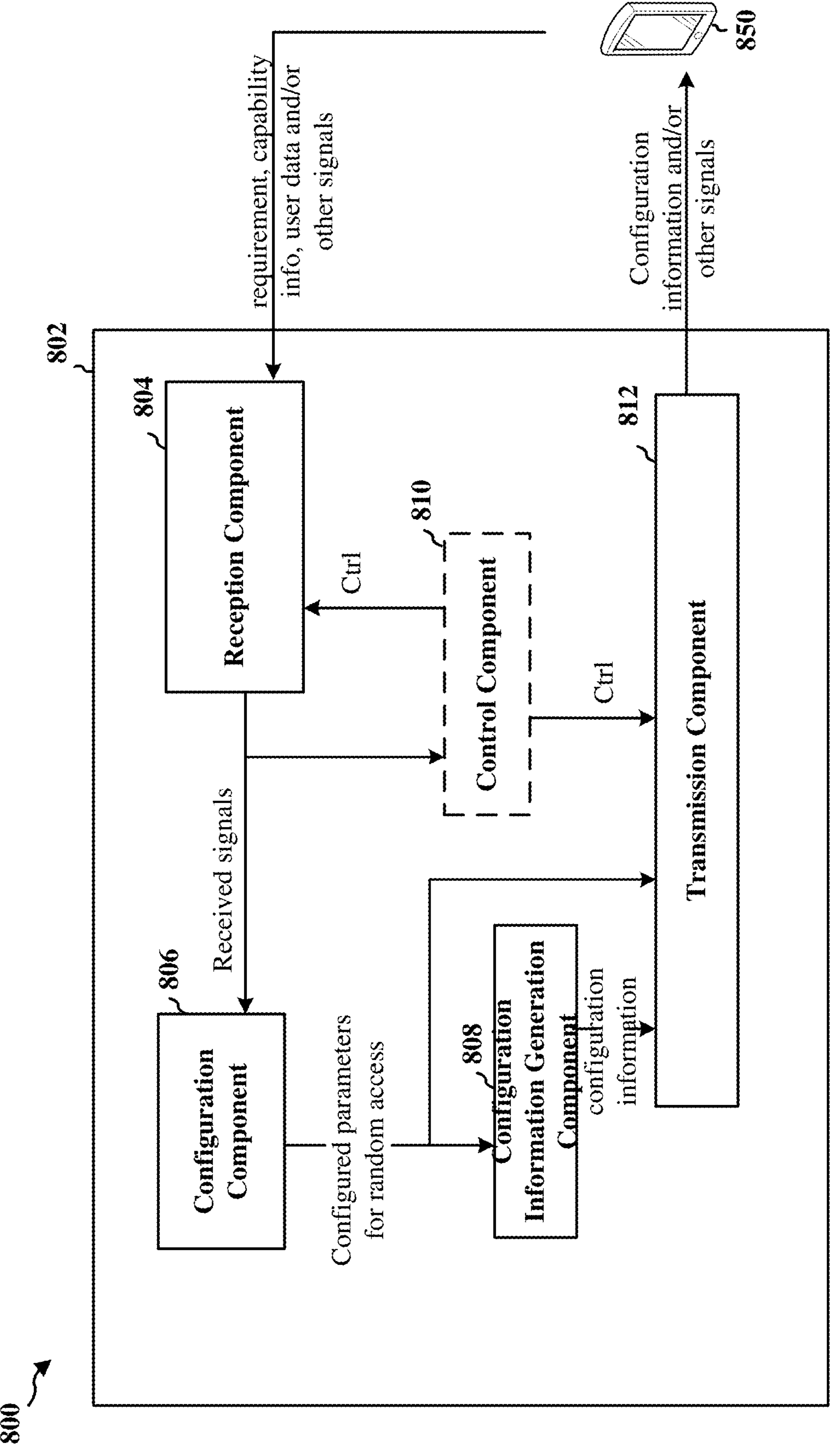
FIG. 8 is an example data flow diagram illustrating data flow between different means/components in an example apparatus, e.g., a base station, in accordance with certain aspects of the present disclosure.

FIG. 8 is an example data flow diagram 800 illustrating the data flow between different means/components in an example apparatus 802. The apparatus may be a base station (e.g., such as base station 180, 310, 1050). The apparatus 802 may include a reception component 804, a configuration component 806, a configuration information generation component 808, a control component 810, and a transmission component 812.

The reception component 804 may be configured to receive and process messages and/or other information from other devices such as UE 850. The signals/information received by the reception component 804 may be provided to the configuration component 806, the control component 810 and/or other components of the apparatus 802 for further processing and use in performing various operations at the apparatus 802. In one configuration, the reception component 804 may receive at least one of a requirement or capability information of at least one device (e.g., a UE, including an IoT type device) that needs to perform random access. In one aspect, the requirement of the at least one device may indicate a request for a type or level of random access (e.g., 2-step RACH, or 4-step RACH), or coverage requirement level from among a plurality of different coverage requirement levels. In one aspect, the capability information may indicate capability to support a type of random access (e.g., 2-step RACH, 4-step RACH, or both), or an operating bandwidth (e.g., 5 MHz, 20 MHz etc.) supported by the at least one device.

The configuration component 806 may determine and/or configure parameters for random access based on at least one of the requirement or the capability information. In some configurations, as part of configuring the parameters the configuration component 806 may configure one or more of configuration information or parameters for random access, resources on which the random access will take place, numerology associated with the random access, bandwidth associated with the random access, precoding associated with the random access, or periodicity associated with the random access. In various configurations, the configuration component 806 may be configured to select the parameters of the configuration information on at least one of the received requirement or the capability information. In one aspect, the configuration component 806 may be configured to select a waveform for the random access. In some configurations, as part of configuring the parameters, the configuration component 806 may be further configured to select the sequences carried by the waveform. The configuration information indicating the configured parameters may be provided by the configuration component 806 to the configuration information generation component 808 and the transmission component 812 in some configurations.

The configuration information generation component 808 may be configured to determine and/or generate configuration information (e.g., for random access) having the configured parameters in accordance with aspects described herein, e.g., configured/selected/determined by the configuration component 806 as discussed above. The configuration information may comprise one or more random access channel (RACH) occasions, the one or more RACH occasions for only the 2-step random access or both the 2-step random access and the 4-step random access. The configuration information determined/generated by the configuration information generation component 808 may be provided to the transmission component 812 for transmission.

The transmission component 812 may be configured to transmit signals to at least one external device, e.g., UE 850, and other UEs. For example, the transmission component 812 may be configured to transmit the configuration information indicating the configured parameters for random access. In some configurations, the at least one device may include one of a plurality of, e.g., IoT devices in a cell served by the apparatus 802, and the plurality of IoT devices may have same or similar random access requirements. In such configurations, the transmission component 812 may transmit the configuration information indicating the configured parameters for the random access common to the plurality of IoT devices. In some configurations, the configuration information for random access may be transmitted in a PDSCH or a PBCH. In some configurations, a grant for the PDSCH may be transmitted via a group common PDCCH. In some configurations, the configuration information may be carried by a SIB, a MIB, a RRC message, or combinations thereof. In various configurations, the transmission component 812 may be further configured to transmit the random access configuration information having the configured parameters. In some configurations, the transmission of the configuration information may be a broadcast or multicast to a plurality of devices including the at least one device (e.g., UE 850).

The control component 810 may be configured to control the transmission schedule and/or transmission timing of one or more signals transmitted by the transmission component 812. In some configurations, the control component 810 may be implemented within the transmission component 812. In some configurations, the control component 810 may be configured to control the operation of the apparatus 802 in accordance with aspects described herein, and accordingly control one or more components of the apparatus 802 to operate in accordance with aspects described herein.

The apparatus may include additional components that perform the processes/algorithms discussed herein. As such, each step/block of an algorithm may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
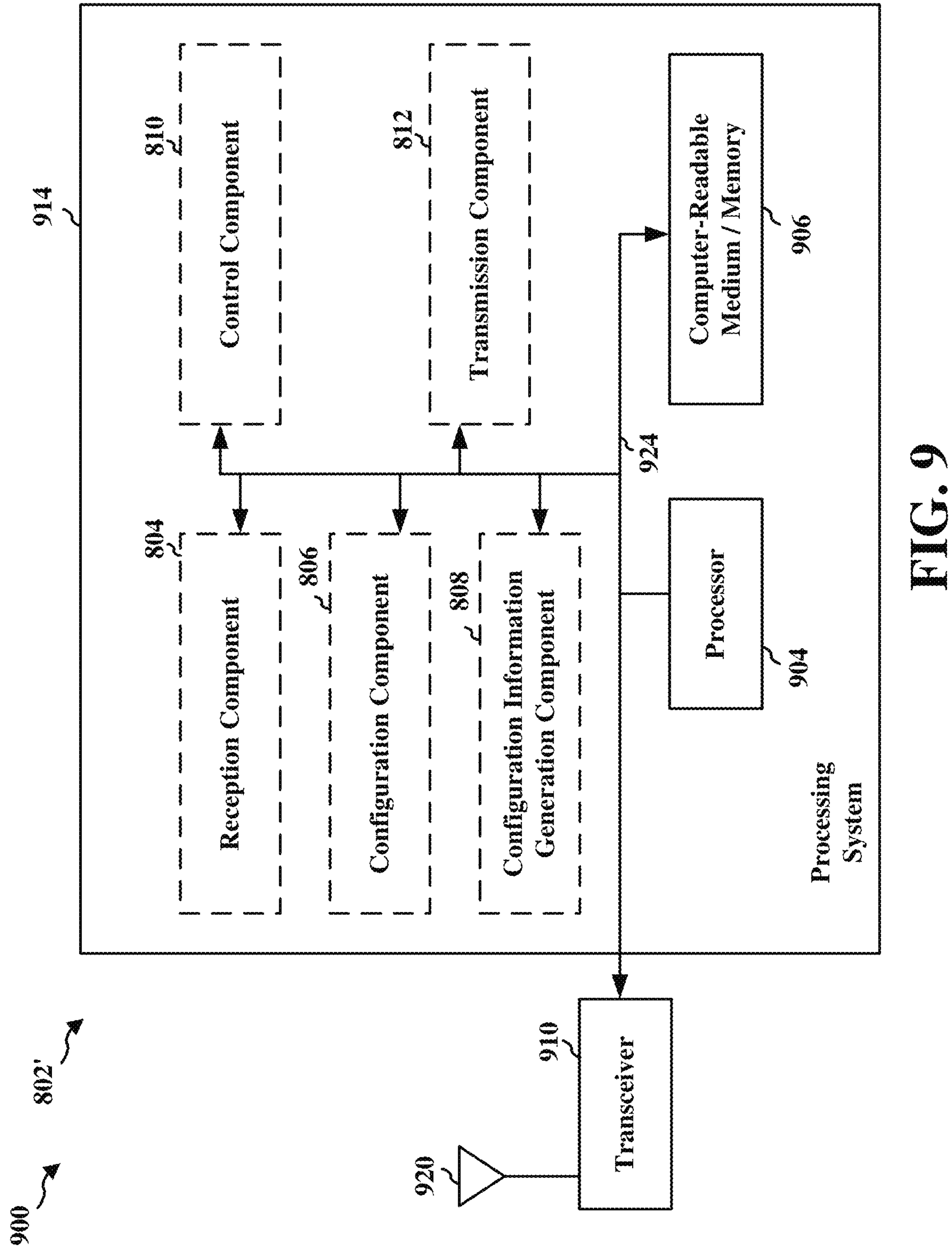
FIG. 9 is a diagram illustrating an example of hardware implementation for an apparatus employing a processing system, in accordance with certain aspects of the present disclosure.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375.

In one configuration, the apparatus 802/802' for wireless communication includes means for receiving at least one of a requirement or capability information of at least one device that needs to perform random access. In some configurations, the apparatus further comprises means for configuring parameters associated with configuration information based on at least one of the requirement or the capability information, wherein configuring the parameters includes configuring one or more of a waveform type of the configuration information, resources on which the configuration information will be transmitted, numerology associated with the random access, bandwidth associated with the random access, precoding associated with the random access, or periodicity associated with the random access. In some configurations, the apparatus further comprises means for transmitting the configuration information having the configured parameters.

In some configurations, the means for configuring the parameters is configured to select the parameters for the configuration information based on requirement and capability information of the at least one device. In some configurations, the random access comprises a waveform, and the means for configuring the parameters is further configured to select the configurations of and the sequences carried by the waveform. In one configuration, the at least one device comprises a narrow bandwidth IoT device, and the means for configuring the parameters associated with the configuration information further configures a scheme to reduce inter-cell interference or another type of interference. In one configuration, the at least one device comprises a wide bandwidth IoT device, and the means for configuring the parameters associated with the configuration information further configures a frequency hopping pattern.

In some configurations, the means for transmitting is further configured to transmit configuration information indicating the configured parameters for the configuration information common to, e.g., a plurality of IoT devices including the at least one device. In one configuration, the configuration information is transmitted by the means for transmitting in a PDSCH, and a grant for the PDSCH is transmitted via a group common PDCCH.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
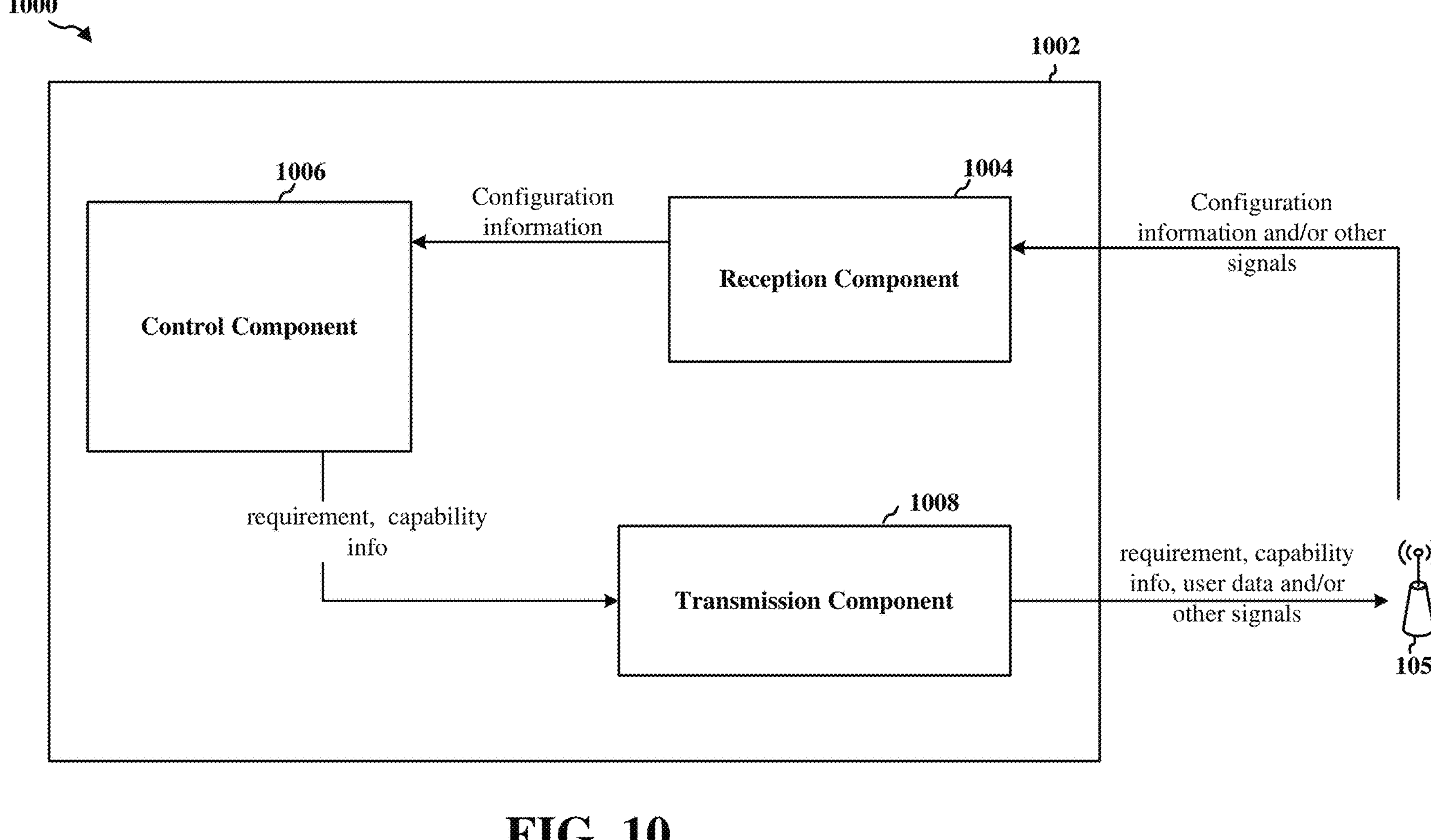
FIG. 10 is an example data flow diagram illustrating data flow between different means/components in an example apparatus, e.g., a UE, in accordance with certain aspects of the present disclosure.

FIG. 10 is an example data flow diagram 1000 illustrating the data flow between different means/components in an exemplary apparatus 1002. The apparatus may be a UE (e.g., such as UE 104, 350, 850). The apparatus includes a reception component 1004, a control component 1006, and a transmission component 1008.

The reception component 1004 may be configured to receive control information (e.g., configuration information), data, and/or other information from other devices including, e.g., base station 1050. The signals/information may be received by the reception component 1004 in accordance with the processes/algorithms discussed herein. The received signals/information may be provided to one or more components of the apparatus 1002 for further processing and use in performing various operations in accordance with the processes/algorithms described herein.

The transmission component 1008 may be configured to transmit data, control information and/or other signaling to one or more external devices including, e.g., base station 1050. For example, in some configurations, the transmission component 1008 may be configured to transmit an indication of at least one of a requirement or capability information of the apparatus 1002 to the base station 1050. In some configurations, the requirement may indicate a request for a type or level of random access (e.g., 2-step RACH, or 4-step RACH), a coverage level from among a set of different coverage levels. In some configurations, the requirement level is quantized and indicated via a bitmap, where the bitmap is transmitted in a PUCCH or communicated as a group index in a scheduling request. Thus, in some configurations, the requirement and/or capability information of the apparatus may be indicated through such a bitmap. In some such configurations, the transmission component 1008 may transmit the bitmap communicating the requirement level corresponding to the apparatus 1002.

In one configuration, the reception component 1004 may be configured to receive, from the base station 1050, configuration information indicating configured parameters for the configuration information, the parameters having been configured based on at least one of the transmitted requirement or the capability information of the apparatus 1002. In some configurations, the apparatus 1002 is one of a plurality of IoT devices, e.g., in a cell served by the base station 1050, and the plurality of IoT devices may have same or similar random access requirements. In one such configuration, the reception component 1004 may receive the configuration information indicating the configured parameters for the configuration information common to, e.g., the plurality of IoT devices. In some configurations, the configuration information may be received in the system information carried in a PDSCH, and a grant for the PDSCH may be received via a group common PDCCH. The received configuration information may be provided to the control component 1006 for use in controlling various operations of the apparatus 1002 in accordance with the processes/algorithms described herein. The received configuration information (e.g., one or more parameters) may also be used by reception component 1004 to monitor for, receive and decode the configuration information from the base station 1050.

In various configurations, the reception component 1004 may be further configured to receive the configuration information having the parameters configured based on at least one of the transmitted requirement or the capability information of the apparatus 1002. The configured parameters may include one or more of a waveform type of the random access, resources on which the random access will be performed, numerology associated with the random access, bandwidth associated with the random access, precoding associated with the random access, or periodicity associated with the random access. In some configurations, the configuration information may be received in a broadcast or multicast from the base station 1050. In one configuration, the random access may comprise a waveform. In some configurations, the parameters associated with the configuration information may further comprise a frequency hopping pattern.

The control component 1006 may be configured to control, e.g., configuration information determination and related operations in accordance with the techniques described herein. For example, the control component 1006 may be configured to perform at least one step of random access, using the received configuration information. The control component 1006 may be further configured to control the transmission/reception of one or more random access related signals at the apparatus 1002. In some configurations, the control component 1006 may be configured to control the operation of the apparatus 1002 in accordance with the processes/algorithms described herein, and accordingly control one or more components of the apparatus 1002 to operate in accordance with the processes/algorithms described herein.

The apparatus may include additional components that perform each of the processes/algorithms discussed herein. As such, each process/algorithm may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
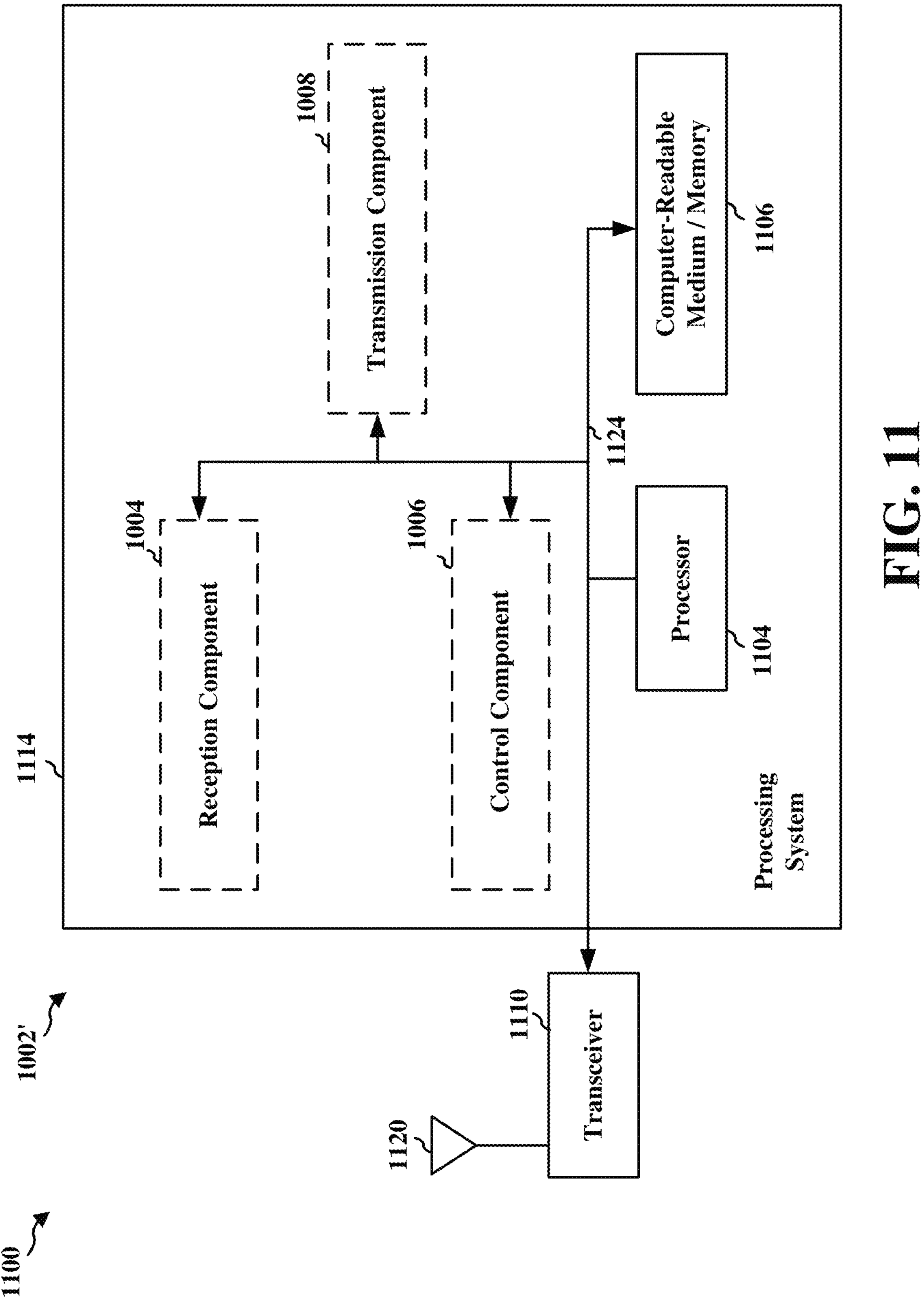
FIG. 11 is a diagram illustrating an example of hardware implementation for an apparatus employing a processing system, in accordance with certain aspects of the present disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication is a UE comprising means for transmitting an indication of at least one of a requirement or capability information of the UE, e.g., to a base station. The apparatus 1002/1002' may further comprise means for receiving configuration information having parameters configured based on at least one of the requirement or the capability information of the UE, the configured parameters including one or more of a waveform type of the random access, resources on which the random access will be performed, numerology associated with the random access, bandwidth associated with the random access, precoding associated with the random access, or periodicity associated with the random access. In some configurations, the requirement may indicate a type or level of random access (e.g., 2-step RACH, 4-step RACH) requested, or coverage level from among a set of different coverage levels. In some configurations, the requirement level is quantized and indicated via a bitmap, where the bitmap is transmitted in a PUCCH or communicated as a group index in a scheduling request. Thus, in some configurations, the requirement and/or capability information of the UE (apparatus 1002) may be indicated through such a bitmap. In some such configurations, the means for transmitting may be configured to transmit, e.g., to the base station, the bitmap communicating the requirement level corresponding to the apparatus 1002.

In some configurations, the means for receiving may be further configured to receive, from a base station, configuration information indicating configured parameters for random access, the parameters having been configured by the base station based on at least one of the transmitted requirement or the capability information of the UE. In some configurations, the UE (apparatus 1002) is one of a plurality of, e.g., IoT devices, e.g., in a cell served by the base station, and the plurality of IoT devices may have same or similar random access requirements. In one such configuration, the means for receiving may be configured to receive configuration information indicating the configured parameters for the random access common to the plurality of IoT devices. In some configurations, the configuration information for random access may be received in the system information carried in a PDSCH, and a grant for the PDSCH may be received via a group common PDCCH.

In one configuration, the apparatus 1002/1002' may further comprise means for performing at least one step of random access.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As discussed, 2-step RACH procedure may be applicable to any size of the cell provided by a base station, all RRC states in which an UE may operate, and/or whether or not the UE has a valid timing advance (e.g., for adjustment of the timing of uplink transmission by the UE). Compared to 4-step RACH procedure, 2-step RACH procedure may achieve lower latency (e.g., fewer message exchanges/handshaking), lower signaling overhead, higher UE multiplexing capacity (e.g., UEs sharing time, frequency, or space resources, whereas in 4-step RACH, for example, an individual grant is assigned to a UE in msg2 with no resource sharing), and higher spectral efficiency. Because 2-step RACH involves fewer number of steps than 4-step RACH, a UE may perform 2-step RACH with less latency and may need to monitor less signaling, leading to lower power consumption, thus 2-step RACH may be a suitable choice for UEs for which battery power preservation and/or low latency may be important considerations, including IoT UEs. On the other hand, payload transmission of 2-step RACH may be constrained by limited support for payload size, MCS, and QoS (quality of service) control. Because of UEs sharing resources for 2-step RACH, there may be multi-user interference on a 2-step RACH UE, which may lead to a constrained payload size. Therefore, factors such as overloading ratio (e.g., comprising an indication of the number of transmitting UEs multiplexed in a same dimension of radio resources) or traffic load may be considered in determining, e.g., a proper payload size or MCS for 2-step RACH. Also, because of the sharing and the resulting multi-user interference in 2-step RACH, QoS control may be more complicated, as QoS control for multiple UEs may need to be configured simultaneously, whereas for 4-step RACH, QoS control for each UE may be configured individually due to, e.g., the individual grant. Msg3 of 4-step RACH is based on the grant in msg2, and MCS for msg3, for example, may be based on CSI (channel state information). For 2-step RACH, there is no grant, so there may not be CSI feedback or frequency selective scheduling, so selection of payload size or MCS may be more complicated. Details of 2-step RACH are being discussed in standards development meetings. A legacy UE or 4-step RACH UE (e.g., supporting 4-step RACH procedure only) may not recognize information specific to 2-step RACH, such as RACH occasion (RO) and slot format (SF) for 2-step RACH. Also, since a 2-step RACH UE may also support 4-step RACH, a UE performing 2-step random access may conditionally fall back to 4-step random access. For example, due to the nature of some UL transmissions, after a number of unsuccessful attempts at performing 2-step RACH, a switch to 4-step RACH may be needed for the transmissions. As one example, a counter may be used to count the number of unsuccessful attempts at performing 2-step RACH, and after a threshold number of unsuccessful attempts has been reached, a switch may be made to performing 4-step RACH. As another example, a counter may be used to count the number of unsuccessful attempts at performing 4-step RACH, and after a threshold number of unsuccessful attempts has been reached, a switch may be made to performing 2-step RACH. Therefore, 2-step RACH and 4-step RACH may complement each other to enable improved network operation. Thus, supporting the co-existence of 2-step RACH and 4-step RACH procedures (e.g., through techniques for transmission schemes) may enhance the flexibility, scalability, capacity, and QoS (e.g., supporting different QoS requirements) of transmissions (e.g., UL transmissions) from different RRC states.

To support co-existence of 2-step RACH and 4-step RACH, 2-step RACH and 4-step RACH occasions and signaling support may be jointly configured. A RACH occasion may be a transmission opportunity for a UE performing random access and may comprise at least one of time, frequency, or space resource for initiating 2-step RACH or 4-step RACH. Indication of RACH occasions or resource assignment for RACH occasions may be carried by, for example, SIB (e.g., SIB 412), or MIB, or another form of RRC signaling. Because MIB may be more limited in size than SIB, according to one aspect, MIB may be used to carry a smaller number of bits than SIB, such as bits that indicate to a UE whether configuration information, or additional configuration information, for 2-step RACH is available in SIB. The system information may be scrambled by a group-RNTI dedicated to 2-step RACH, such that only 2-step RACH UEs may be able to decode or de-scramble the system information. The group-RNTI may be used instead of or in addition to another type of RNTI (e.g., system information RNTI (SI-RNTI)). 2-step RACH UE may use: a subset of the preamble sequences of 4-step RACH, the same preamble sequences of 4-step RACH, expanded preamble sequences of 4-step RACH, different preamble sequences than preamble sequences of 4-step RACH, or combinations thereof.

In accordance with an aspect of the present disclosure, 4-step RACH occasions may be masked for 2-step RACH. For example, a network may re-configure, e.g., the periodicity or density of 4-step RACH occasions. One or more RACH occasions for 2-step RACH may occupy a subset of RACH occasions normally for 4-step RACH, and the subset of RACH occasions may be for 2-step RACH only. 2-step RACH may use the same or expanded preamble sequences of 4-step RACH. Such re-configuration information may be carried by, e.g., system information with two sub-fields, say $SI_A$ and $SI_B$. $SI_B$ may be only recognizable or decodable by a UE that supports 2-step RACH (2-step RACH UE). For example, $SI_B$ may be a part of system information that may be scrambled by the group-RNTI. 4-step RACH UE may decode $SI_A$ and transmit with, e.g., lower duty cycles and/or lower density. 2-step RACH UE may decode both $SI_A$ and $SI_B$ and transmit in the remaining ROs not occupied by 4-step RACH. FIG. 12 illustrates an example of masking 4-step RACH occasions for 2-step RACH. In this example, a base station of a network supporting both 2-step RACH and 4-step RACH may assign RO #1 and RO #3 of 4-step RACH to be used for 2-step RACH. This assignment may be transparent to a legacy UE (e.g., $SI_A$ may be the same as system information normally used by a legacy UE to determine its ROs), so that the legacy UE may only determine that RO #0 and RO #2 are available for it to perform 4-step RACH. Due to RO #1 and RO #3 not being available for 4-step RACH, periodicity or density of 4-step RACH occasions is reduced. With reference to FIG. 12 as an example, without 2-step RACH, ROs for 4-step RACH may occur every X slots or symbols (or another mechanism for indicating periodicity, density, or duty cycle of ROs), and with 2-step RACH, ROs for 4-step RACH may occur every 2X slots or symbols.

In accordance with an aspect of the present disclosure, overloading of 4-step RACH occasions for 2-step RACH may be performed. For example, regarding the relation of PRACH resources between 2-step and 4-step RACH, the network may have the flexibility to configure shared ROs between 2-step RACH and 4-step RACH. Random access taking place in a particular RO may be considered a stochastic event because a UE may not perform random access in every RO that is assigned to it. Therefore, factors such as how many UEs utilize a particular RO for random access or which RO does a UE utilize for random access may be considered stochastic in nature. Thus, combining ROs for 2-step RACH and for 4-step RACH in a RO normally for 4-step RACH may be an efficient utilization of network resources. For example, the network may configure the periodicity or density of 2-step RACH occasions based on the existing ROs for 4-step RACH. One or more RACH occasions for 2-step RACH may occupy a subset of RACH occasions for 4-step RACH, and the subset of RACH occasions may be shared by both 2-step RACH and 4-step RACH. Such configuration information may be carried by system information, RRC messages, or combinations thereof, e.g., system information targeting or intended for 2-step RACH UE only. 2-step RACH may use the same or expanded preamble sequences of 4-step RACH. For example, for shared ROs, 4-step RACH and 2-step RACH may be configured with separate preambles, and 2-step RACH preambles may be allocated from the non-contention based RACH (CBRA) preambles associated with each SSB (synchronization signal/PBCH block or synchronization signal block). The 2-step RACH procedure may be allocated a different subset of preamble sequences that may be, e.g., code division multiplexed. For example, the time/frequency/space domain resource allocation for shared ROs may be indicated by a BS in RRC parameters such as: msgA-ssb-sharedROmaskindex, msgA-CB-PreamblesPerSSB, etc. For example, for shared ROs, one or more parameters such as msgA-CB-PreamblesPerSSB may be used to configure the number of contention-based 2-step RACH preambles per SSB. For example, in case of shared ROs, a subset of ROs associated with the same SS/PBCH block index, within an SSB-RO mapping cycle, may be shared, where one or more parameters such as msgA-ssb-sharedROmaskindex may be used to indicate the subset of 4-step RACH ROs shared with 2-step RACH. If such a parameter is not configured, then all 4-step RACH ROs may be shared with 2-step RACH. System information targeting or intended for 4-step RACH UE may remain unchanged, such that the addition of RACH opportunities to RACH opportunities normally for 4-step RACH is transparent to a legacy UE. FIG. 13 illustrates an example of overloading 4-step RACH occasions for 2-step RACH UE. In the example of FIG. 13, RO #1 is overloaded with both 4-step RACH and 2-step RACH. The presence of 2-step RACH occasions in RO #1 may be transparent to a legacy UE. The presence of 4-step RACH occasions in RO #1 may be recognized by a 2-step RACH UE, or may be transparent to the 2-step RACH UE. The network may determine to overload RO #1 based on a determination that RO #1 is better suited for overloading than other ROs, based on factors such as loading estimation, channel conditions, estimation of lower likelihood of interference or collision between 4-step RACH and 2-step RACH taking place in RO #1, etc. In the event of a collision (e.g., 4-step RACH and 2-step RACH sharing the same RO both select the same resources such as preamble sequences, etc.), the network/base station may address the collision based on resolution mechanisms so that both the 4-step RACH and the 2-step RACH may happen.

In accordance with an aspect of the present disclosure, new RACH occasions for 2-step RACH may be added. For example, regarding the relation of PRACH resources between 2-step and 4-step RACH, the network may have the flexibility to configure separate ROs for 2-step and 4-step RACH. The network may configure new ROs for 2-step RACH UE only. One or more RACH occasions that are only for 2-step RACH and that are different from RACH occasions for 4-step RACH may be added. No changes are made to ROs normally for 4-step RACH. This technique may be the least disruptive to 4-step RACH UEs, but may involve more system resources or overhead because of the added ROs for 2-step RACH. Such new configuration information may be carried by system information, e.g., system information targeting or intended for 2-step RACH UE only. For example, in the case of 4-step RACH and 2-step RACH with separately configured ROs, the network may configure a separate time domain RO configuration parameter such as prach-ConfigurationIndex for 2-step RACH, which may be sent via system information or RRC information, and which may indicate the available set of ROs for the transmission of the random access preamble for 2-step RACH. System information targeting or intended for 4-step RACH UE may remain unchanged. For example, in the case of 4-step RACH and 2-step RACH with separately configured ROs, for the frequency domain location of the ROs of 2-step RACH, the network may configure separate parameters such as msg1-FDM and msg1-FrequencyStart for 2-step RACH ROs. For example, for separately configured ROs, one or more parameters such as ssb-perRACH-OccasionAndCBPreamblesPerSSB may be used to configure the number of SSBs per RO, and number of contention-based preambles for each SSB. 2-step RACH may use the same or expanded preamble sequences of 4-step RACH. For example, for 2-step RACH in separate ROs, one or more parameters such as totalNumberOfRA-Preambles may be separately configured for the 2-step RACH, dedicating a number of preambles (e.g., up to a maximum such as 64 preambles) only for the 2-step RACH. If such a configuration is absent, all preambles available for 4-step RACH (e.g., 64 preambles) may be available for 2-step RA. For example, for 4-step RACH and 2-step RACH with separately configured ROs, the preamble formats of 4-step RACH and 2-step RACH may be different. For example, for 2-step RACH in separate ROs, one or more parameters such as prach-RootSequenceIndex, zeroCorrelationZoneConfig, restrictedSetConfig, etc., may be separately configured for 2-step RACH. If such parameters are absent, corresponding 4-step RACH parameters may be used. FIG. 14 illustrates an example of adding RACH occasions for 2-step RACH UE. In the example of FIG. 14, new RO #0 and new RO #1 dedicated to 2-step RACH UE only are added.

To support co-existence of 2-step RACH and 4-step RACH, MCS configurations and signaling support may be leveraged. As discussed, there are differences in the transmission schemes used for message 3 (msg3), which may carry data in 4-step RACH and msgA payload, which may carry data in 2-step RACH. A number of differences are shown in the table below.

Example differences of UL Transmission for 4-step RACH (msg3) and 2-step RACH (msgA payload)

| | | | | |
|---|---|---|---|---|
| msg3 | Grant based | Contention free by design | OMA between different UEs | Closed-loop timing and power control |
| msgA payload | Grant free | Contention-based by design | NOMA between different UEs | Open-loop timing and power control |

For example, for msg3, orthogonal multiple access (OMA) (e.g., orthogonal in time, frequency, and/or space domain) may be used between different UEs because each UE has an individual grant, whereas for msgA payload, non-OMA (NOMA) may be used between different UEs. Also, msg2 of 4-step RACH may provide feedback from the base station to the UE before the UE transmits msg3, allowing msg3 to have the ability to be more reliable due to the closed-loop timing and power control. For msgA payload, there may not be such feedback, so a 2-step UE may need to depend on open-loop timing and power control, which may not be as reliable or accurate as closed-loop timing and power control. As a result of such differences, more robust modulation and coding scheme may be leveraged for transmission of, e.g., msgA payload. New MCS configurations, or constrained MCS configurations (e.g., based on a limited subset of MCS configurations for 4-step RACH), may be determined for 2-step RACH. Such determination may take into account factors such as payload size. The new MCS configuration may be determined beforehand and sent in system information, because a grant is not available in 2-step RACH to provide MCS configuration, e.g., for transmission of payload. Transmission of the payload of msgA (first message of 2-step RACH) may be based, at least in part, on a MCS for the payload, the MCS may be: different from a MCS for the msg3 of the second type of random access, a subset of the MCS for the msg3, or a combination thereof. The MCS configurations for 2-step RACH may be based, at least in part, on, e.g., payload size, resource allocation, waveform, or coverage conditions. For example, a lower or less complex modulation type/format and/or a lower coding rate may be selected. For example, msgA PUSCH in 2-step RACH may be limited to use the first 16 entries of QAM-64 MCS tables. For example, the value range of MCS index may be limited to a range of 0 to 15. The modulation order for MCS entries 0-1 may be, for example, QPSK. 4-step RACH may use MCS tables different from those used by 2-step RACH. Even if 4-step RACH uses the same MCS tables as 2-step RACH, 4-step RACH, for example, may use all 32 entries ranging from 0 to 31. Such MCS configurations may be signaled as part of system information and, e.g., multicast to 2-step RACH UEs (instead of broadcast to all UEs). The system information may be scrambled by a group-RNTI specifically for 2-step RACH UEs, and 4-step RACH UEs may be unaware of, or ignore such system information (e.g., because a legacy/4-step RACH UE may not be able to decode such system information).

Figure 15:
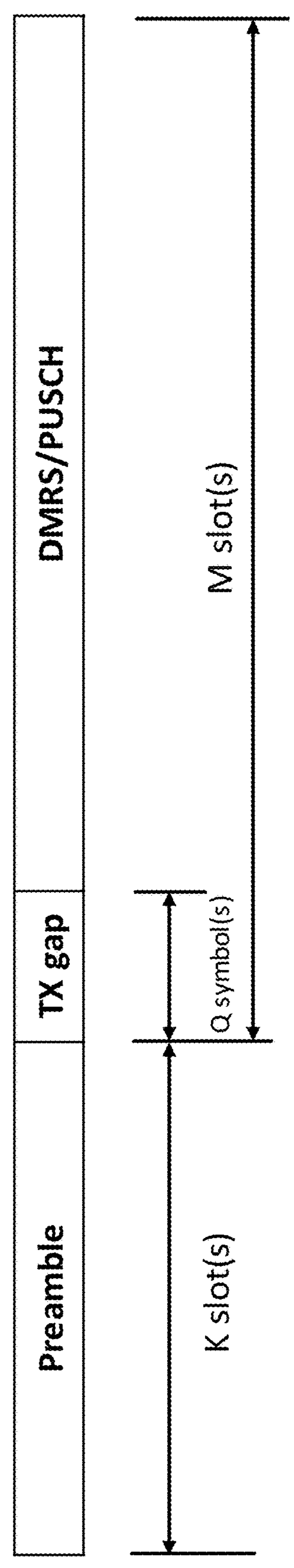
Figure 16:
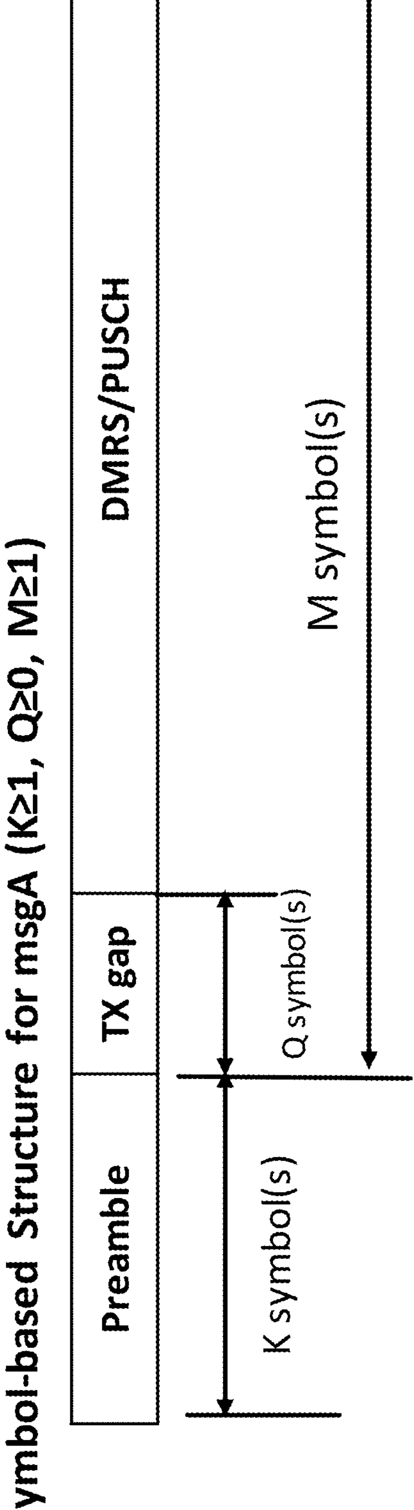

To support co-existence of 2-step RACH and 4-step RACH, RACH slot format (SF) configuration for 2-Step RACH may be leveraged. Due to the TDM (time division multiplexing) of preamble and payload in msgA, as well as the non-orthogonal multiplexing of 2-step RACH in the same time, frequency, and/or space resources, one or more new RACH slot formats may be defined for 2-step RACH. Slot format indication may be sent in system information, e.g., in SIB, to 2-step RACH UE. The system information may be scrambled by a group RNTI specifically for 2-step RACH UE. For example, one or more parameters or configurations such as the following may be further defined and used per msgA PUSCH configuration: number of slots (e.g., in active UL BWP (bandwidth part) numerology) containing one or multiple PUSCH occasions (POs), each slot having the same time domain resource allocation; number of time domain POs in each slot; POs including guard period may be contiguous in time domain within a slot; SLIV (start and length indicator value)-based, indicating the start symbol of the first PO in each slot, and the number of occupied symbols of each PO in time domain; the number of occupied symbols excludes the guard period; PUSCH mapping type A (e.g., slot-based) or B (e.g., mini-slot based); and etc. The one or more parameters or configuration, including SLIV-based indication for msgA PUSCH transmission, may be signaled by system information (e.g., SIB), RRC messages, or combinations thereof. A PO may be a PUSCH transmission opportunity for a UE performing random access and may comprise at least one of time, frequency, or space resource for transmitting PUSCH. For example, when a UE transmits msgA, it needs to select a RO and a PO for msgA preamble and msgA payload, respectively. On a msgA transmission occasion, the following rules may be specified for RO and PO selected by a UE: RO and PO are associated with the same SSB beam; RO and PO are always time division multiplexed; RO and PO cannot be mapped to the same slot, and a minimum gap (e.g., Tg) may be lower bounded by N symbols (N may be hard coded in a standards specification). PUSCH transmission in msgA may span multiple slots or multiple symbols in time domain. FIGS. 15 and 16 illustrate examples of 2-step RACH slot formats for msgA. In the example of FIG. 15, a slot-based structure for msgA is illustrated. In this example, granularity of resource assignment for the preamble or payload may be based on a slot. In the example of FIG. 16, a symbol-based structure for msgA is illustrated. In this example, granularity of resource assignment for the preamble or payload may be based on a symbol. For example, a msgA with a long preamble (spanning or occupying multiple slots) may be assigned a slot format based on a slot-based structure, and a msgA with a short preamble (spanning or occupying multiple symbols rather than multiple slots) may be assigned a slot format based on a symbol-based structure. Similarly, a msgA with a long payload (spanning or occupying multiple slots) may be assigned a slot format based on a slot-based structure, and a msgA with a short payload (spanning or occupying multiple symbols rather than multiple slots) may be assigned a slot format based on a symbol-based structure. MCS may be a factor when assessing the length/size of the payload.

Figure 17:
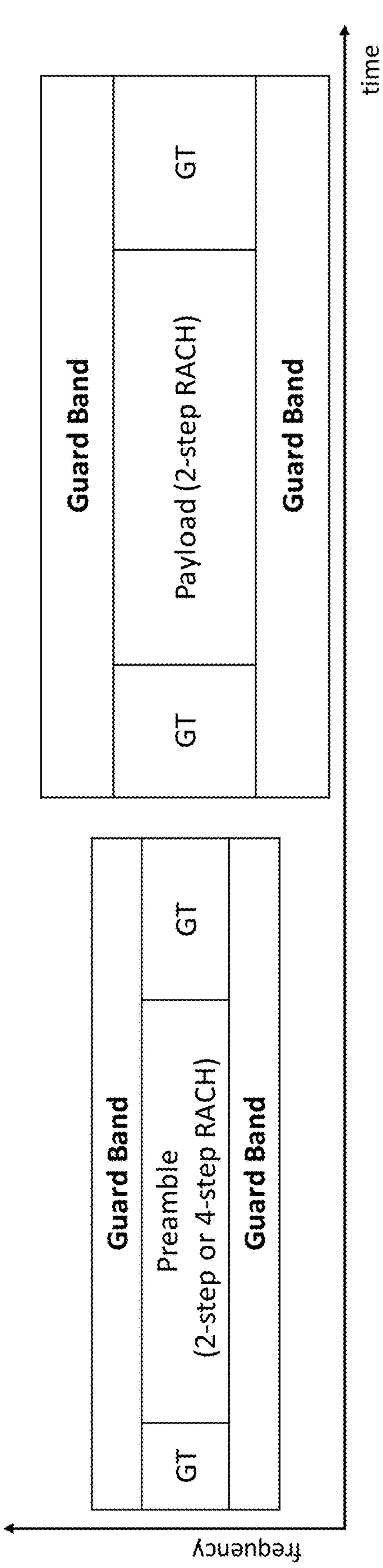

To support co-existence of 2-step RACH and 4-step RACH, guard band configuration and/or guard time (GT) configuration for msgA of 2-step RACH may be leveraged. Guard bands and guard time may be used for 2-step RACH to compensate for the lack of timing advance (TA) to align the payload before it is transmitted. Also, to reduce interference (e.g., inter-symbol interference (ISI), inter-carrier interference (ICI)) of 2-step RACH to other UL transmissions, guard band and guard time may be configured for msgA transmission, e.g., for preamble and/or payload. Preamble and payload of msgA may span or occupy different time, frequency, or space resources. The guard-band and/or guard-time configured for the preamble of msgA may use those defined for the NR PRACH preamble or the LTE PRACH preamble, or may use different settings (e.g., settings specifically for msgA preamble). The guard-band and guard-time configured for the payload (e.g., DMRS/PUSCH) of msgA may use the same setting(s) as the msgA preamble configuration(s), or may use different settings (e.g., settings specifically for msgA payload). Depending on the size of the data in the payload and/or coding associated with the payload, the payload portion of msgA may span or occupy more bandwidth, and/or larger number of slots or symbols, than the preamble. Therefore, for example, instead of sub-PRB setting used for a preamble, guard band configured for payload may be expanded to span or occupy at least a whole PRB. For example, RRC parameters for msgA PUSCH configuration may include configurable guard bands up to, for example, 1 PRB (physical resource block). For example, the RRC parameters for msgA PUSCH configuration may include configurable guard periods in the units of OFDM symbols. For example, a configurable guard period between hops may be supported, if intra-slot frequency hopping per PO for msgA is configured. The value of guard period between POs may be reused if configured; otherwise, no guard period is used, for example. Such guard band configuration and/or guard time configuration may be specified in a standard, or sent in system information, e.g., via SIB or MIB (e.g., to address dynamic changes in the network). FIG. 17 provides an illustration of example guard band and guard time configurations for msgA of 2-step RACH. The top and bottom guard bands shown in FIG. 17 for the preamble and/or the payload may comprise the same bandwidth (e.g., if preamble and/or payload is located away from band edge) or different bandwidth (e.g., if preamble and/or payload is located at band edge), based on location of the preamble and/or payload.

Figure 18:
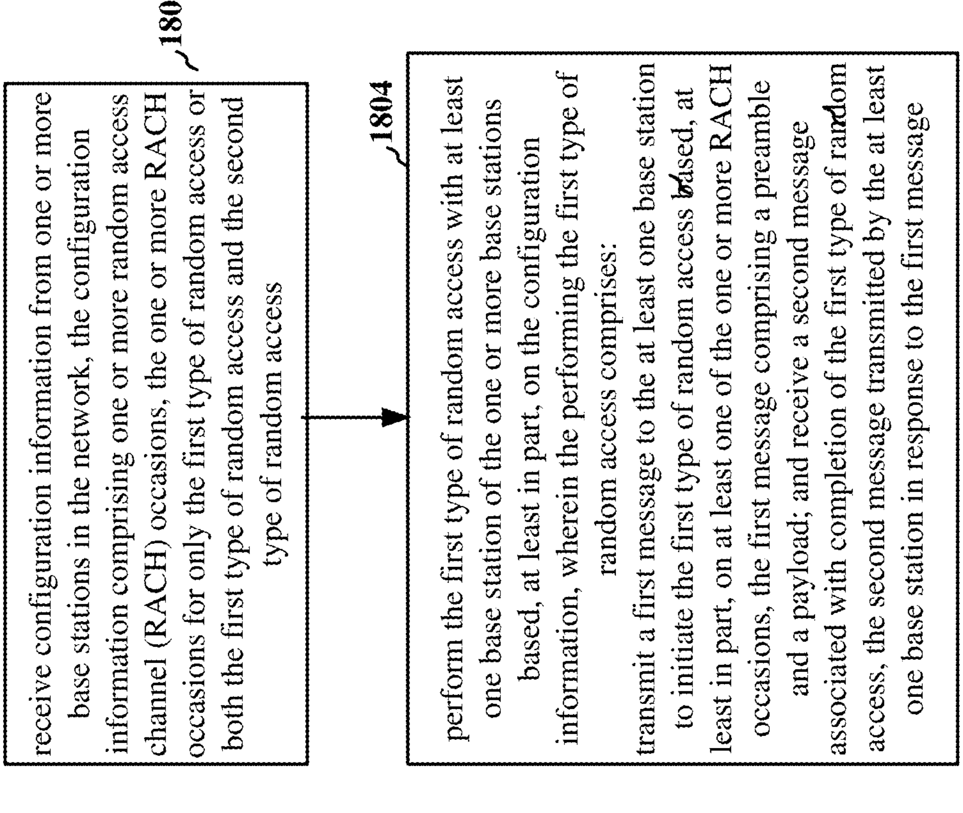
FIG. 18 illustrates example operations for a UE, in accordance with certain aspects of the present disclosure.

FIG. 18 illustrates example operations 1800, e.g., by a UE (e.g., UE 104, 350, 850, 1002/1002'), for wireless communications, in accordance with certain aspects of the present disclosure. The UE may comprise an Internet-of-Things (IoT) UE. The UE may operate in a network supporting co-existence of a first type of random access (e.g., 2-step random access) and a second type of random access (e.g., 4-step random access). The UE may receive configuration information from one or more base stations in the network, the configuration information comprising one or more random access channel (RACH) occasions, the one or more RACH occasions for only the first type of random access or both the first type of random access and the second type of random access (1802). The configuration information may be for one or more two-step RACH procedures, or one or more two-step RACH procedures and one or more four-step RACH procedures. The UE may perform the first type of random access with at least one base station of the one or more base stations based, at least in part, on the configuration information (1804). The performing the first type of random access may comprise: transmitting a first message to the at least one base station to initiate the first type of random access based, at least in part, on at least one of the one or more RACH occasions, the first message comprising a preamble and a payload; and receiving a second message associated with completion of the first type of random access, the second message transmitted by the at least one base station in response to the first message (1804).

In one aspect, the second type of random access may comprise: transmission of a message 1 (msg 1) to the at least one base station to initiate the second type of random access, the msg1 comprising a preamble; reception of a message 2 (msg 2) associated with a random access response, the msg2 transmitted by the at least one base station in response to the msg1; transmission a message 3 (msg3) in response to the msg2, the msg3 comprising information transmitted on an uplink shared channel; and reception of a message 4 (msg4) associated with completion of the second type of random access, the msg4 transmitted by the at least one base station in response to the msg3.

In one aspect, the UE may receive the configuration information in: a system information block (SIB), a master information block (MIB), a radio resource control (RRC) message, or a combination thereof. In one aspect, the SIB may be scrambled by a group radio network temporary identifier (RNTI) for the first type of random access.

In one aspect, the one or more RACH occasions may comprise at least one of time, frequency, or space resource for initiating the first type or the second type of random access.

In one aspect, the preamble of the first type of random access may comprise a preamble sequence from a subset of one or more preamble sequences for the second type of random access, a preamble sequences other than the one or more preamble sequences for the second type of random access, or a combination thereof.

In one aspect, the one or more RACH occasions may comprise one or more RACH occasions for the first type of random access and occupy a subset of RACH occasions normally for the second type of random access, and wherein the subset of RACH occasions is for the one or more RACH occasions for the first type of random access only. In one aspect, the subset of RACH occasions for the first type of random access may comprise a reduced periodicity, a reduced duty cycle, or a reduced density relative to the RACH occasions normally for the second type of random access. The reduced density may comprise: reduced density in time, reduced density in frequency, or a combination thereof. In one aspect, the one or more RACH occasions may comprise: one or more RACH occasions for the first type of random access in a first field of a system information block (SIB), one or more RACH occasions for the second type of random access in a second field of the SIB, or a combination thereof. In one aspect, the one or more RACH occasions for the second type of random access may be used by a UE initiating the second type of random access, and the initiating the second type of random access may comprise a reduced periodicity, a reduced duty cycle, or a reduced density relative to the RACH occasions normally for the second type of random access. In one aspect, the UE may determine the one or more RACH occasions for the first type of random access and the one or more RACH occasions for the second type of random access based on the configuration information; and transmit the first message in the determined one or more RACH occasions for the first type of random access and not in the determined one or more RACH occasions for the second type of random access. In one aspect, the configuration information may further comprise at least one parameter indicating at least one of: the number of synchronization signal/physical broadcast channel (PBCH) blocks (SSBs), the number of contention-based preambles for each SSB, or a combination thereof. In one aspect, a first preamble format for the first type of random access may be different from a second preamble format for the second type of random access. In one aspect, the configuration information may further comprise at least one parameter specifically for the first type of random access.

In one aspect, the one or more RACH occasions may comprise one or more RACH occasions for the first type of random access and occupy a subset of RACH occasions for the second type of random access, and wherein the subset of RACH occasions is for both the one or more RACH occasions for the first type of random access and the one or more RACH occasions for the second type of random access. In one aspect, the one or more RACH occasions for the first type of random access may be sent in: system information, RRC messaging, or a combination thereof, for a UE performing the first type of random access only. In one aspect, the preamble of the first type of random access may comprise a preamble sequence other than the one or more preamble sequences for the second type of random access, and wherein the preamble of the first type of random access is selected from non-contention based random access (non-CBRA) preambles associated with each of one or more synchronization signal/physical broadcast channel (PBCH) blocks (SSBs). In one aspect, the number of the non-CBRA preambles associated with each SSB may be configured by at least one parameter. In one aspect, the subset of RACH occasions for both the one or more RACH occasions for the first type of random access and the one or more RACH occasions for the second type of random access may be configured by at least one parameter, and wherein the subset of RACH occasions is associated with a same synchronization signal/physical broadcast channel (PBCH) block (SSB) index.

In one aspect, the one or more RACH occasions may comprise one or more RACH occasions that are only for the first type of random access and that are different from RACH occasions configured by the at least one base station for the second type of random access. In one aspect, the one or more RACH occasions only for the first type of random access may be sent in: system information, RRC messaging, or a combination thereof, for a UE performing the first type of random access only. In one aspect, the configuration information may further comprise at least one parameter indicating at least one of: the number of synchronization signal/physical broadcast channel (PBCH) blocks (SSBs), the number of contention-based preambles for each SSB, or a combination thereof. In one aspect, a first preamble format for the first type of random access may be different from a second preamble format for the second type of random access. In one aspect, the configuration information may further comprise at least one parameter specifically for the first type of random access.

In one aspect, transmission of the payload of the first message may be based, at least in part, on a modulation and coding scheme (MCS) for the payload, the MCS being: different from a MCS for the msg3 of the second type of random access, a subset of the MCS for the msg3, or a combination thereof. In one aspect, the MCS for the payload may be based, at least in part, on a size of the payload, a resource allocation of the payload, a waveform of the payload, a coverage condition of the UE, or a combination thereof. In one aspect, the UE may receive the configuration information in: a system information block (SIB), a RRC message, or a combination thereof, wherein the configuration information may further comprises configuration for the MCS for the payload. In one aspect, the SIB may be scrambled by a group radio network temporary identifier (RNTI) for the first type of random access and is only for UEs performing the first type of random access.

In one aspect, the configuration information may further comprise slot format information only for the first type of random access. In one aspect, the UE may receive the configuration information in: a system information block (SIB), a RRC message, or a combination thereof. In one aspect, the SIB may be scrambled by a group radio network temporary identifier (RNTI) for the first type of random access and may be only for UEs performing the first type of random access. In one aspect, the slot format information may indicate a slot-based structure for the first message, a symbol-based structure for the first message, or a combination thereof. In one aspect, the configuration information may further comprise one or more indications of: the number of slots containing one or more physical uplink shared channel (PUSCH) occasions and the number of time domain PUSCH occasions in each slot of the number of slots, and wherein each slot of the number of slots has a same time domain resource allocation. In one aspect, PUSCH occasions that include a guard period may be contiguous in time domain within a slot.

In one aspect, the configuration information may comprise at least one of guard band configuration or guard time configuration for the preamble and for the payload of the first message of the first type of random access. In one aspect, the at least one of the guard band configuration or the guard time configuration for the preamble of the first message may be same as guard band configuration or guard time configuration for the preamble of the msg 1 of the second type of random access, respectively. In one aspect, the at least one of the guard band configuration or the guard time configuration for the payload may be same as the at least one of the guard band configuration or guard time configuration for the preamble of the first message, respectively. In one aspect, the at least one of the guard band configuration or the guard time configuration for the payload may be different from the at least one guard band configuration or guard time configuration for the preamble of the first message, respectively. In one aspect, the guard band configuration for the payload may comprise a physical resource block (PRB). In one aspect, the at least one of guard band configuration or guard time configuration for the preamble and for the payload of the first message may be: received in a system information block (SIB), received in a master information block (MIB), received in a RRC message, specified in a standard, or a combination thereof. In one aspect, intra-slot frequency hopping for each physical uplink shared channel (PUSCH) occasion of the first message may be configured, and a guard time between hops of the intra-slot frequency hopping may be configurable.

Figure 19:
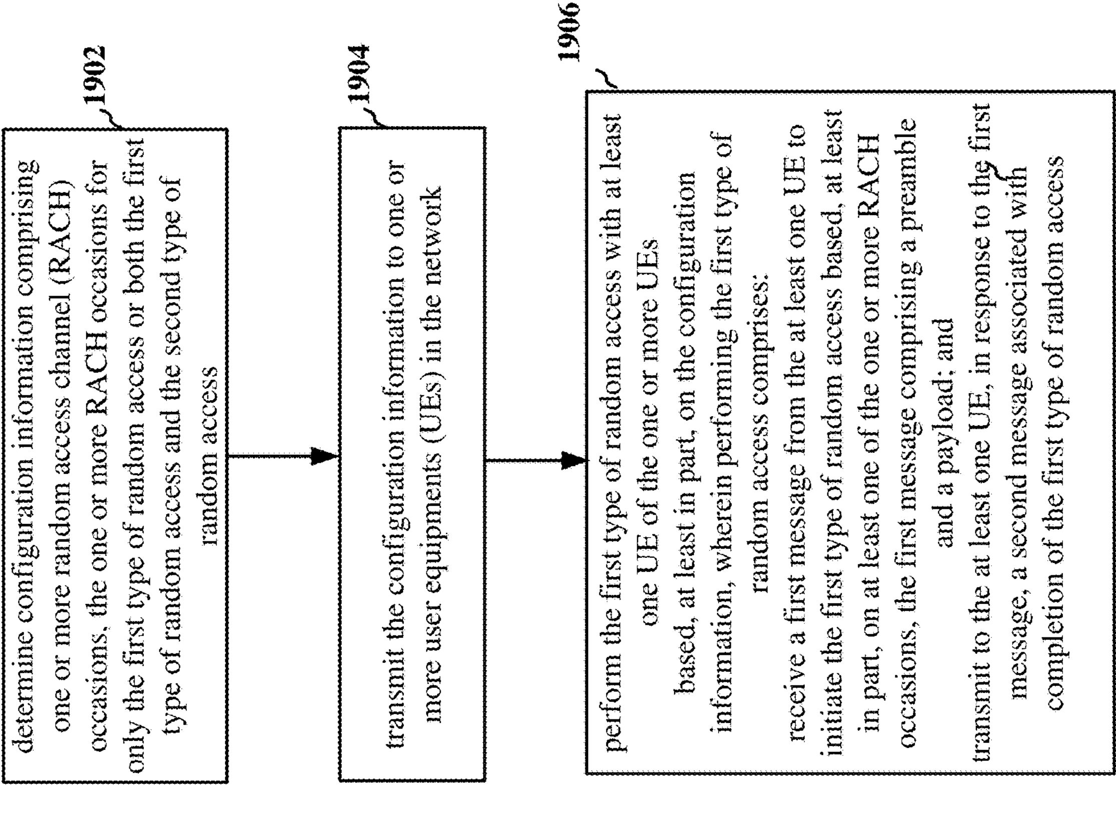
FIG. 19 illustrates example operations for a bases station (BS), in accordance with certain aspects of the present disclosure.

FIG. 19 illustrates example operations 1900, e.g., by a BS (e.g., BS 102, 180, 310, 802/802'), for wireless communications, in accordance with certain aspects of the present disclosure. The BS may operate in a network supporting co-existence of a first type of random access (e.g., 2-step random access) and a second type of random access (e.g., 4-step random access). The BS may determine configuration information comprising one or more random access channel (RACH) occasions, the one or more RACH occasions for only the first type of random access or both the first type of random access and the second type of random access (1902). The configuration information may be for one or more two-step RACH procedures, or one or more two-step RACH procedures and one or more four-step RACH procedures. The BS may transmit the configuration information to one or more user equipments (UEs) in the network (1904). The BS may perform the first type of random access with at least one UE of the one or more UEs based, at least in part, on the configuration information (1906). Performing the first type of random access may comprise: receiving a first message from the at least one UE to initiate the first type of random access based, at least in part, on at least one of the one or more RACH occasions, the first message comprising a preamble and a payload; and transmitting to the at least one UE, in response to the first message, a second message associated with completion of the first type of random access (1906).

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. The word "exemplary" is used herein to mean "serving as an example, instance, or illustration." Any aspect described herein as "exemplary" is not necessarily to be construed as preferred or advantageous over other aspects. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.). As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps, techniques, mechanisms, methodologies, and/or actions may be interchanged with one another, and/or work together with each other, without departing from the scope of the claims. In other words, unless a specific order or combination of steps, techniques, mechanisms, methodologies, and/or actions is specified, the order, combination, and/or use of specific steps, techniques, mechanisms, methodologies, and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for performing, means for determining, means for initiating, means for completing, means for scrambling, means for assigning, means for occupying, means for defining, means for targeting, means for configuring, means for processing, means for indicating, means for measuring, means for estimating, means for identifying, means for enabling, means for selecting, means for transmitting, means for receiving, means for sending, means for mapping, means for synchronizing, means for comparing, means for prioritizing, means for assigning, means for allocating, means for rejecting, means for restricting, means for increasing, and/or means for decreasing may include one or more processors/controllers, transmitters, receivers, antennas, and/or other modules, components, or elements of, for example, user equipment 104, 350, 850, 1002/1002', base station 102, 180, 310, 802/802', and/or another network entity. The words "module," "mechanism," "element," "device," and the like may not be a substitute for the word "means." As such, no claim element is to be construed as a means plus function unless the element is expressly recited using the phrase "means for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE) in a network supporting co-existence of a first type of random access and a second type of random access, the first type of random access being a two-step random access and the second type of random access being a four-step random access, comprising:

receiving configuration information from one or more network entities in the network, the configuration information indicating multiple random access channel (RACH) occasions, including at least one of the multiple RACH occasions that is indicated as supported for the UE initiating the first type of random access by transmitting at least a first preamble, from a first preamble set that is generated by the UE based on a first preamble root sequence index, to the one or more network entities and supported for the UE initiating the second type of random access by transmitting at least a second preamble, from a second preamble set that is generated by the UE based on a second preamble root sequence index that is different from the first preamble root sequence index, to the one or more network entities; and performing the first type of random access with at least one network entity of the one or more network entities based, at least in part, on the configuration information, wherein the performing the first type of random access comprises:

transmitting a first message to the at least one network entity to initiate the first type of random access based, at least in part, on at least one of the multiple RACH occasions, the first message comprising the first preamble and a payload; and receiving a second message associated with completion of the first type of random access, the second message transmitted by the at least one network entity in response to the first message.

2. The method of claim 1, wherein the second type of random access comprises: transmission of the second preamble to the at least one network entity to initiate the second type of random access;

reception of a random access response, the random access response transmitted by the at least one network entity in response to the second preamble;

transmission of a third message, in response to the random access response, to the at least one network entity, the third message comprising information transmitted on an uplink shared channel; and reception of a fourth message associated with completion of the second type of random access, the fourth message transmitted by the at least one network entity in response to the third message.

3. The method of claim 1, further comprising receiving the configuration information in: a system information block (SIB), a master information block (MIB), a radio resource control (RRC) message, or a combination thereof.

4. The method of claim 3, wherein the SIB is scrambled by a group radio network temporary identifier (RNTI) for the first type of random access.

5. The method of claim 2, wherein the multiple RACH occasions comprise at least one of time, frequency, or space resource for initiating the first type or the second type of random access.

6. The method of claim 2, wherein the first preamble of the first type of random access comprises: a preamble sequence from a subset of one or more preamble sequences for the second type of random access, a preamble sequence other than the one or more preamble sequences for the second type of random access, or a combination thereof.

7. The method of claim 6, wherein the multiple RACH occasions comprise one or more RACH occasions for the first type of random access and occupy a subset of RACH occasions normally for the second type of random access, and wherein the subset of RACH occasions is for the one or more RACH occasions for the first type of random access only.

8. The method of claim 7, wherein the subset of RACH occasions for the first type of random access comprises a reduced periodicity, a reduced duty cycle, or a reduced density relative to the RACH occasions normally for the second type of random access.

9. The method of claim 8, wherein the multiple RACH occasions comprise: one or more RACH occasions for the first type of random access in a first field of a system information block (SIB), one or more other RACH occasions for the second type of random access in a second field of the SIB, or a combination thereof.

10. The method of claim 9, wherein the one or more RACH occasions for the second type of random access are used by a UE initiating the second type of random access, and wherein the initiating the second type of random access comprises a reduced periodicity, a reduced duty cycle, or a reduced density relative to the RACH occasions normally for the second type of random access.

11. The method of claim 9, further comprising:

determining the one or more RACH occasions for the first type of random access and the one or more RACH occasions for the second type of random access based on the configuration information; and transmitting the first message in the determined one or more RACH occasions for the first type of random access and not in the determined one or more RACH occasions for the second type of random access.

12. The method of claim 7, wherein the configuration information further comprises at least one parameter indicating at least one of: a number of synchronization signal/physical broadcast channel (PBCH) blocks (SSBs), a number of contention-based preambles for each SSB, or a combination thereof.

13. The method of claim 7, wherein a first preamble format for the first type of random access is different from a second preamble format for the second type of random access.

14. The method of claim 7, wherein the configuration information further comprises at least one parameter specifically for the first type of random access.

15. The method of claim 6, wherein the multiple RACH occasions comprise one or more RACH occasions for the first type of random access and occupy a subset of RACH occasions for the second type of random access, and wherein the subset of RACH occasions is for both the one or more RACH occasions for the first type of random access and the one or more RACH occasions for the second type of random access.

16. The method of claim 15, wherein the one or more RACH occasions for the first type of random access are sent in: system information, radio resource control (RRC) messaging, or a combination thereof, for a UE performing the first type of random access only.

17. The method of claim 15, wherein the first preamble of the first type of random access comprises a preamble sequence other than the one or more preamble sequences for the second type of random access, and wherein the first preamble of the first type of random access is selected from non-contention based random access (non-CBRA) preambles associated with each of one or more synchronization signal/physical broadcast channel (PBCH) blocks (SSBs).

18. The method of claim 17, wherein a number of the non-CBRA preambles associated with each of the one or more SSBs is configured by at least one parameter.

19. The method of claim 15, wherein the subset of RACH occasions for both the one or more RACH occasions for the first type of random access and the one or more RACH occasions for the second type of random access is configured by at least one parameter, and wherein the subset of RACH occasions is associated with a same synchronization signal/physical broadcast channel (PBCH) block (SSB) index.

20. The method of claim 6, wherein the one or more RACH occasions comprise one or more RACH occasions that are only for the first type of random access and that are different from RACH occasions configured by the at least one network entity for the second type of random access.

21. The method of claim 20, wherein the one or more RACH occasions only for the first type of random access are sent in: system information, radio resource control (RRC) messaging, or a combination thereof, for a UE performing the first type of random access only.

22. The method of claim 20, wherein the configuration information further comprises at least one parameter indicating at least one of: a number of synchronization signal/physical broadcast channel (PBCH) blocks (SSBs), a number of contention-based preambles for each SSB, or a combination thereof.

23. The method of claim 20, wherein a first preamble format for the first type of random access is different from a second preamble format for the second type of random access.

24. The method of claim 20, wherein the configuration information further comprises at least one parameter specifically for the first type of random access.

25. The method of claim 2, wherein transmission of the payload of the first message is based, at least in part, on a modulation and coding scheme (MCS) for the payload, the MCS being: different from a MCS for the third message of the second type of random access, a subset of the MCS for the third message, or a combination thereof.

26. The method of claim 25, wherein the MCS for the payload is based, at least in part, on a size of the payload, a resource allocation of the payload, a waveform of the payload, a coverage condition of the UE, or a combination thereof.

27. The method of claim 26, further comprising receiving the configuration information in: a system information block (SIB), a radio resource control (RRC) message, or a combination thereof, wherein the configuration information further comprises configuration for the MCS for the payload.

28. The method of claim 2, wherein the configuration information further comprises slot format information only for the first type of random access.

29. The method of claim 28, further comprising receiving the configuration information in; a system information block (SIB), a radio resource control (RRC) message, or a combination thereof.

30. The method of claim 28, wherein the slot format information indicates a slot-based structure for the first message, a symbol-based structure for the first message, or a combination thereof.

31. The method of claim 28, wherein the configuration information further comprises one or more indications of: a number of slots containing one or more physical uplink shared channel (PUSCH) occasions and a number of time domain PUSCH occasions in each slot of the number of slots, and wherein each slot of the number of slots has a same time domain resource allocation.

32. The method of claim 28, wherein physical uplink shared channel (PUSCH) occasions that include a guard period are contiguous in time domain within a slot.

33. The method of claim 1, wherein the configuration information further comprises at least one of guard band configuration or guard time configuration for the first preamble and for the payload of the first message of the first type of random access.

34. The method of claim 33, wherein the at least one of the guard band configuration or the guard time configuration for the first preamble of the first message is same as guard band configuration or guard time configuration for the second preamble of a different first message of the second type of random access, respectively.

35. The method of claim 33, wherein the at least one of the guard band configuration or the guard time configuration for the payload is same as the at least one of the guard band configuration or guard time configuration for the first preamble of the first message, respectively.

36. The method of claim 33, wherein the at least one of the guard band configuration or the guard time configuration for the payload is different from the at least one guard band configuration or guard time configuration for the first preamble of the first message, respectively.

37. The method of claim 33, wherein the guard band configuration for the payload comprises a physical resource block (PRB).

38. The method of claim 33, wherein the at least one of guard band configuration or guard time configuration for the first preamble and for the payload of the first message is: received in a system information block (SIB), received in a master information block (MIB), received in a radio resource control (RRC) message, specified in a standard, or a combination thereof.

39. The method of claim 33, wherein intra-slot frequency hopping for each physical uplink shared channel (PUSCH) occasion of the first message is configured, and wherein a guard time between hops of the intra-slot frequency hopping is configurable.

40. The method of claim 1, wherein the UE comprises an Internet-of-Things (IoT) UE.

41. A method for wireless communications by a network entity in a network supporting co-existence of a first type of random access and a second type of random access, the first type of random access being a two-step random access and the second type of random access being a four-step random access, comprising:

determining configuration information indicating multiple random access channel (RACH) occasions, including at least one of the multiple RACH occasions that is indicated as supported for a user equipment (UE) initiating the first type of random access by transmitting at least a first preamble, from a first preamble set that is generated by the UE based on a first preamble root sequence index, to at least one network entity and supported for the UE initiating the second type of random access by transmitting at least a second preamble, from a second preamble set that is generated by the UE based on a second preamble root sequence index that is different from the first preamble root sequence index, to the at least one network entity;

outputting the configuration information for one or more UEs in the network; and performing the first type of random access with at least one UE of the one or more UEs based, at least in part, on the configuration information, wherein performing the first type of random access comprises:

receiving a first message from the at least one UE to initiate the first type of random access based, at least in part, on at least one of the multiple RACH occasions, the first message comprising the first preamble and a payload; and outputting for the at least one UE, in response to the first message, a second message associated with completion of the first type of random access.

42. The method of claim 41, wherein the second type of random access comprises:

reception of the second preamble from the at least one UE to initiate the second type of random access;

transmission of a random access response to the at least one UE, the random access response transmitted by the network entity in response to the second preamble;

reception of a third message from the at least one UE in response to the random access response, the third message comprising information transmitted on an uplink shared channel; and transmission of a fourth message associated with completion of the second type of random access to the at least one UE, in response to the third message.

43. The method of claim 41, further comprising transmitting the configuration information in: a system information block (SIB), a master information block (MIB), a radio resource control (RRC) message, or a combination thereof.

44. The method of claim 43, further comprising scrambling the SIB by a group radio network temporary identifier (RNTI) for the first type of random access.

45. The method of claim 42, wherein the multiple RACH occasions comprise at least one of time, frequency, or space resource for initiating the first type or the second type of random access.

46. The method of claim 42, wherein the first preamble of the first type of random access comprises: a preamble sequence from a subset of one or more preamble sequences for the second type of random access, a preamble sequence other than the one or more preamble sequences for the second type of random access, or a combination thereof.

47. The method of claim 46, wherein the multiple RACH occasions comprise one or more RACH occasions for the first type of random access and occupy a subset of RACH occasions normally for the second type of random access, and wherein the subset of RACH occasions is for the one or more RACH occasions for the first type of random access only.

48. The method of claim 47, wherein the subset of RACH occasions for the first type of random access comprises a reduced periodicity, a reduced duty cycle, or a reduced density relative to the RACH occasions normally for the second type of random access.

49. The method of claim 48, wherein the multiple RACH occasions comprise: one or more RACH occasions for the first type of random access in a first field of a system information block (SIB), one or more RACH occasions for the second type of random access in a second field of the SIB, or a combination thereof.

50. The method of claim 49, wherein the one or more RACH occasions for the second type of random access are used by a UE initiating the second type of random access, and wherein the initiating the second type of random access comprises a reduced periodicity, a reduced duty cycle, or a reduced density relative to the RACH occasions normally for the second type of random access.

51. The method of claim 49, wherein the at least one UE determines the one or more RACH occasions for the first type of random access and the one or more RACH occasions for the second type of random access based on the configuration information, and further comprising:

receiving the first message from the at least one UE in the determined one or more RACH occasions for the first type of random access and not in the determined one or more RACH occasions for the second type of random access.

52. The method of claim 47, wherein the configuration information further comprises at least one parameter indicating at least one of: a number of synchronization signal/physical broadcast channel (PBCH) blocks (SSBs), a number of contention-based preambles for each SSB, or a combination thereof.

53. The method of claim 47, wherein a first preamble format for the first type of random access is different from a second preamble format for the second type of random access.

54. The method of claim 47, wherein the configuration information further comprises at least one parameter specifically for the first type of random access.

55. The method of claim 49, wherein the multiple RACH occasions comprise one or more RACH occasions for the first type of random access and occupy a subset of RACH occasions for the second type of random access, and wherein the subset of RACH occasions is for both the one or more RACH occasions for the first type of random access and the one or more RACH occasions for the second type of random access.

56. The method of claim 55, wherein the one or more RACH occasions for the first type of random access are sent in: system information, radio resource control (RRC) messaging, or a combination thereof, for a UE performing the first type of random access only.

57. The method of claim 55, wherein the first preamble of the first type of random access comprises a preamble sequence other than the one or more preamble sequences for the second type of random access, and wherein the first preamble of the first type of random access is selected from non-contention based random access (non-CBRA) preambles associated with each of one or more synchronization signal/physical broadcast channel (PBCH) blocks (SSBs).

58. The method of claim 57, wherein a number of the non-CBRA preambles associated with each of the one or more SSBs is configured by at least one parameter.

59. The method of claim 55, wherein the subset of RACH occasions for both the one or more RACH occasions for the first type of random access and the one or more RACH occasions for the second type of random access is configured by at least one parameter, and wherein the subset of RACH occasions is associated with a same synchronization signal/physical broadcast channel (PBCH) block (SSB) index.

60. The method of claim 52, wherein the one or more RACH occasions comprise one or more RACH occasions that are only for the first type of random access and that are different from RACH occasions configured by the at least one network entity for the second type of random access.

61. The method of claim 60, wherein the one or more RACH occasions only for the first type of random access are sent in: system information, radio resource control (RRC) messaging, or a combination thereof, for a UE performing the first type of random access only.

62. The method of claim 60, wherein the configuration information further comprises at least one parameter indicating at least one of: a number of synchronization signal/physical broadcast channel (PBCH) blocks (SSBs), a number of contention-based preambles for each SSB, or a combination thereof.

63. The method of claim 60, wherein a first preamble format for the first type of random access is different from a second preamble format for the second type of random access.

64. The method of claim 60, wherein the configuration information further comprises at least one parameter specifically for the first type of random access.

65. The method of claim 42, wherein transmission of the payload of the first message is based, at least in part, on a modulation and coding scheme (MCS) for the payload, the MCS being: different from a MCS for the third message of the second type of random access, a subset of the MCS for the third message, or a combination thereof.

66. The method of claim 65, wherein the MCS for the payload is based, at least in part, on a size of the payload, a resource allocation of the payload, a waveform of the payload, a coverage condition of the UE, or a combination thereof.

67. The method of claim 66, further comprising transmitting the configuration information in: a system information block (SIB), a radio resource control (RRC) message, or a combination thereof, wherein the configuration information further comprises configuration for the MCS for the payload.

68. The method of claim 42, wherein the configuration information further comprises slot format information only for the first type of random access.

69. The method of claim 68, further comprising transmitting the configuration information in: a system information block (SIB), a radio resource control (RRC) message, or a combination thereof.

70. The method of claim 68, wherein the slot format information indicates a slot-based structure for the first message, a symbol-based structure for the first message, or a combination thereof.

71. The method of claim 68, wherein the configuration information further comprises one or more indications of: a number of slots containing one or more physical uplink shared channel (PUSCH) occasions and a number of time domain PUSCH occasions in each slot of the number of slots, and wherein each slot of the number of slots has a same time domain resource allocation.

72. The method of claim 68, wherein physical uplink shared channel (PUSCH) occasions that include a guard period are contiguous in time domain within a slot.

73. The method of claim 41, wherein the configuration information further comprises at least one of guard band configuration or guard time configuration for the first preamble and for the payload of the first message of the first type of random access.

74. The method of claim 73, wherein the at least one of the guard band configuration or the guard time configuration for the first preamble of the first message is same as guard band configuration or guard time configuration for the second preamble of a different first message of the second type of random access, respectively.

75. The method of claim 73, wherein the at least one of the guard band configuration or the guard time configuration for the payload is same as the at least one of the guard band configuration or guard time configuration for the first preamble of the first message, respectively.

76. The method of claim 73, wherein the at least one of the guard band configuration or the guard time configuration for the payload is different from the at least one guard band configuration or guard time configuration for the first preamble of the first message, respectively.

77. The method of claim 73, wherein the guard band configuration for the payload comprises a physical resource block (PRB).

78. The method of claim 73, wherein the at least one of guard band configuration or guard time configuration for the first preamble and for the payload of the first message is: transmitted in a system information block (SIB), transmitted in a master information block (MIB), transmitted in a radio resource control (RRC) message, specified in a standard, or a combination thereof.

79. The method of claim 73, wherein intra-slot frequency hopping for each physical uplink shared channel (PUSCH) occasion of the first message is configured, and wherein a guard time between hops of the intra-slot frequency hopping is configurable.

80. The method of claim 41, wherein the at least one UE comprises an Internet-of-Things (IoT) UE.

81. An apparatus for wireless communication in a network supporting co-existence of a first type of random access and a second type of random access, the first type of random access being a two-step random access and the second type of random access being a four-step random access, the apparatus comprising:

at least one processor; and memory coupled to the at least one processor, the memory comprising instructions executable by the at least one processor to cause the apparatus to:

receive configuration information from one or more network entities in the network, the configuration information indicating multiple random access channel (RACH) occasions, including at least one of the multiple RACH occasions that is indicated as supported for the apparatus initiating the first type of random access by transmitting at least a first preamble, from a first preamble set that is generated by the apparatus based on a first preamble root sequence index, to the one or more network entities and supported for the apparatus initiating the second type of random access by transmitting at least a second preamble, from a second preamble set that is generated by the apparatus based on a second preamble root sequence index that is different from the first preamble root sequence index, to the one or more network entities; and perform the first type of random access with at least one network entity of the one or more network entities based, at least in part, on the configuration information, wherein the performing the first type of random access comprises:

transmitting a first message to the at least one network entity to initiate the first type of random access based, at least in part, on at least one of the multiple RACH occasions, the first message comprising the first preamble and a payload; and receiving a second message associated with completion of the first type of random access, the second message transmitted by the at least one network entity in response to the first message.

82. An apparatus for wireless communication in a network supporting co-existence of a first type of random access and a second type of random access, the first type of random access being a two-step random access and the second type of random access being a four-step random access, the apparatus comprising:

at least one processor; and memory coupled to the at least one processor, the memory comprising instructions executable by the at least one processor to cause the apparatus to:

determine configuration information indicating multiple random access channel (RACH) occasions, including at least one of the multiple RACH occasions that is indicated as supported for a user equipment (UE) initiating the first type of random access by transmitting at least a first preamble, from a first preamble set that is generated by the UE based on a first preamble root sequence index, to at least one network entity and supported for the UE initiating the second type of random access by transmitting at least a second preamble, from a second preamble set that is generated by the UE based on a second preamble root sequence index that is different from the first preamble root sequence index, to the at least one network entity;

output the configuration information for one or more UEs in the network; and perform the first type of random access with at least one UE of the one or more UEs based, at least in part, on the configuration information, wherein performing the first type of random access comprises:

receiving a first message from the at least one UE to initiate the first type of random access based, at least in part, on at least one of the multiple RACH occasions, the first message comprising the first preamble and a payload; and outputting for the at least one UE, in response to the first message, a second message associated with completion of the first type of random access.

83. An apparatus for wireless communication in a network supporting co-existence of a first type of random access and a second type of random access, the first type of random access being a two-step random access and the second type of random access being a four-step random access, the apparatus comprising:

means for receiving configuration information from one or more network entities in the network, the configuration information indicating multiple random access channel (RACH) occasions, including at least one of the multiple RACH occasions that is indicated as supported for the apparatus initiating the first type of random access by transmitting at least a first preamble, from a first preamble set that is generated by the apparatus based on a first preamble root sequence index, to the one or more network entities and supported for the apparatus initiating the second type of random access by transmitting at least a second preamble, from a second preamble set that is generated by the apparatus based on a second preamble root sequence index that is different from the first preamble root sequence index, to the one or more network entities; and means for performing the first type of random access with at least one network entity of the one or more network entities based, at least in part, on the configuration information, wherein the means for performing the first type of random access comprises:

means for transmitting a first message to the at least one network entity to initiate the first type of random access based, at least in part, on at least one of the multiple RACH occasions, the first message comprising the first preamble and a payload; and means for receiving a second message associated with completion of the first type of random access, the second message transmitted by the at least one network entity in response to the first message.

84. An apparatus for wireless communication in a network supporting co-existence of a first type of random access and a second type of random access, the first type of random access being a two-step random access and the second type of random access being a four-step random access, the apparatus comprising:

means for determining configuration information indicating multiple random access channel (RACH) occasions, including one or more RACH occasions indicated at least one of the multiple RACH occasions that is indicated as supported for a user equipment (UE) initiating the first type of random access by transmitting at least a first preamble, from a first preamble set that is generated by the UE based on a first preamble root sequence index, to at least one network entity and supported for the UE initiating the second type of random access by transmitting at least a second preamble, from a second preamble set that is generated by the UE based on a second preamble root sequence index that is different from the first preamble root sequence index, to the at least one network entity;

means for outputting the configuration information for one or more UEs in the network; and means for performing the first type of random access with at least one UE of the one or more UEs based, at least in part, on the configuration information, wherein the means for performing the first type of random access comprises:

means for receiving a first message from the at least one UE to initiate the first type of random access based, at least in part, on at least one of the multiple RACH occasions, the first message comprising the first preamble and a payload; and means for outputting for the at least one UE, in response to the first message, a second message associated with completion of the first type of random access.

85. A non-transitory computer-readable medium for wireless communication by a user equipment (UE) in a network supporting co-existence of a first type of random access and a second type of random access, the first type of random access being a two-step random access and the second type of random access being a four-step random access, the computer-readable medium comprising code, which when executed by at least one processor, causes the UE to:

receive configuration information from one or more network entities in the network, the configuration information indicating multiple random access channel (RACH) occasions, including at least one of the multiple RACH occasions that is indicated as supported for the UE initiating the first type of random access by transmitting at least a first preamble, from a first preamble set that is generated by the UE based on a first preamble root sequence index, to the one more network entities and supported for the UE initiating the second type of random access by transmitting at least a second preamble, from a second preamble set that is generated by the UE based on a second preamble root sequence index that is different from the first preamble root sequence index, to the one or more network entities; and perform the first type of random access with at least one network entity of the one or more network entities based, at least in part, on the configuration information, wherein the performing the first type of random access comprises:

transmitting a first message to the at least one network entity to initiate the first type of random access based, at least in part, on at least one of the multiple RACH occasions, the first message comprising the first preamble and a payload; and receiving a second message associated with completion of the first type of random access, the second message transmitted by the at least one network entity in response to the first message.

86. A non-transitory computer-readable medium for wireless communication by a network entity in a network supporting co-existence of a first type of random access and a second type of random access, the first type of random access being a two-step random access and the second type of random access being a four-step random access, the computer-readable medium comprising code, which when executed by at least one processor, causes the network entity to:

determine configuration information indicating multiple random access channel (RACH) occasions, including at least one of the multiple RACH occasions that is indicated as supported for a user equipment (UE) initiating the first type of random access by transmitting at least a first preamble, from a first preamble set that is generated by the UE based on a first preamble root sequence index, to at least one network entity and supported for the UE initiating the second type of random access by transmitting at least a second preamble, from a second preamble set that is generated by the UE based on a second preamble root sequence index that is different from the first preamble root sequence index, to the at least one network entity;

output the configuration information for one or more UEs in the network; and perform the first type of random access with at least one UE of the one or more UEs based, at least in part, on the configuration information, wherein performing the first type of random access comprises:

receiving a first message from the at least one UE to initiate the first type of random access based, at least in part, on at least one of the multiple RACH occasions, the first message comprising the first preamble and a payload; and outputting for the at least one UE, in response to the first message, a second message associated with completion of the first type of random access.

* * * * *